United States Patent
Krah

(10) Patent No.: US 10,990,221 B2
(45) Date of Patent: Apr. 27, 2021

(54) MULTI-POWER DOMAIN TOUCH SENSING

(71) Applicant: Apple Inc., Cupertino, CA (US)

(72) Inventor: Christoph H. Krah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/134,604

(22) Filed: Sep. 18, 2018

(65) Prior Publication Data

US 2019/0102037 A1    Apr. 4, 2019

Related U.S. Application Data

(60) Provisional application No. 62/566,089, filed on Sep. 29, 2017.

(51) Int. Cl.
*G06F 3/041* (2006.01)
*G06F 3/044* (2006.01)
*G05F 1/46* (2006.01)

(52) U.S. Cl.
CPC ........ G06F 3/0418 (2013.01); G06F 3/04166 (2019.05); *G05F 1/46* (2013.01);
(Continued)

(58) Field of Classification Search
CPC . G06F 3/044; G06F 3/0412; G01N 35/00712; G01N 27/4148; G01N 2035/00881; G02F 1/13338
See application file for complete search history.

(56) References Cited

U.S. PATENT DOCUMENTS 3,656,065 A    4/1972 Reinhard et al.
3,984,757 A    10/1976 Gott
(Continued)

FOREIGN PATENT DOCUMENTS

CN    102003612 A    4/2011
EP    2131202 A1    9/2009
(Continued)

OTHER PUBLICATIONS

Non-Final Office Action dated Dec. 13, 2018, for U.S. Appl. No. 16/179,565, filed Nov. 2, 2018, nine pages.
(Continued)

*Primary Examiner* — William Lu
(74) *Attorney, Agent, or Firm* — Kubota & Basol LLP

(57) ABSTRACT

The disclosure relates to a touch and/or proximity detection system having some components operating in the guard domain and other components operating in the earth or chassis ground domain. A guard chip in the earth or chassis ground domain can include a voltage driver configured to produce a guard signal, for example. In some examples, the guard signal can be coupled to one or more shielding electrodes of a touch screen and to the ground pin of one or more touch sensing chips of the touch and/or proximity detection system. In this way, for example, the touch sensing chips, which can include sense amplifiers coupled to one or more sensing electrodes of the touch screen, can operate in the guard domain. In some examples, the guard chip can further include differential amplifiers and/or ADCs, allowing these components to operate in the earth or chassis ground domain.

25 Claims, 11 Drawing Sheets

(52) U.S. Cl.
CPC .. *G06F 3/0446* (2019.05); *G06F 2203/04101* (2013.01); *G06F 2203/04107* (2013.01); *G06F 2203/04108* (2013.01)

(56) References Cited

U.S. PATENT DOCUMENTS

| | | | |
|---|---|---|---|
| 3,988,669 | A | 10/1976 | Fasching |
| 4,149,231 | A | 4/1979 | Bukosky |
| 5,041,817 | A | 8/1991 | Reeb |
| 5,095,224 | A | 3/1992 | Renger |
| 5,173,685 | A | 12/1992 | Nimmo |
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,127,899 | A | 10/2000 | Silva et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,373,474 | B1 | 4/2002 | Katabami |
| 6,429,700 | B1 | 8/2002 | Yang |
| 6,690,387 | B2 | 2/2004 | Zimmerman et al. |
| 7,015,894 | B2 | 3/2006 | Morohoshi |
| 7,151,417 | B1 | 12/2006 | Suzuki |
| 7,184,064 | B2 | 2/2007 | Zimmerman et al. |
| 7,211,966 | B2 | 5/2007 | Green et al. |
| 7,288,945 | B2 | 10/2007 | Martinez et al. |
| 7,525,348 | B1 | 4/2009 | Ziazadeh |
| 7,589,596 | B2 | 9/2009 | Masuda et al. |
| 7,663,607 | B2 | 2/2010 | Hotelling et al. |
| 7,961,055 | B2 | 6/2011 | Miyata et al. |
| 7,986,194 | B2 | 7/2011 | Kiyohara et al. |
| 8,149,002 | B2 | 4/2012 | Ossart et al. |
| 8,222,885 | B2 | 7/2012 | Kirchmeier et al. |
| 8,436,687 | B2 | 5/2013 | Aruga et al. |
| 8,479,122 | B2 | 7/2013 | Hotelling et al. |
| 8,917,256 | B2 | 12/2014 | Roziere |
| 8,933,710 | B2 | 1/2015 | Blondin et al. |
| 8,963,372 | B2 | 2/2015 | Takano et al. |
| 9,151,792 | B1 | 10/2015 | Kremin et al. |
| 9,401,697 | B2 | 7/2016 | Blondin et al. |
| 10,120,520 | B2* | 11/2018 | Krah ................ G06F 3/044 |
| 10,459,587 | B2 | 10/2019 | Krah et al. |
| 10,666,259 | B1* | 5/2020 | Mora ............ H03K 19/01750 |
| 10,684,669 | B1* | 6/2020 | Zhou ................ G06F 1/3234 |
| 2004/0125918 | A1 | 7/2004 | Shanmugavel et al. |
| 2005/0030683 | A1 | 2/2005 | Tailliet |
| 2005/0146377 | A1 | 7/2005 | Owen |
| 2005/0162408 | A1* | 7/2005 | Martchovsky ........ G06F 3/044 345/173 |
| 2006/0197753 | A1 | 9/2006 | Hotelling |
| 2006/0202714 | A1* | 9/2006 | Hoang ............... G06F 17/5054 326/38 |
| 2006/0203403 | A1 | 9/2006 | Schediwy et al. |
| 2008/0231292 | A1 | 9/2008 | Ossart |
| 2008/0246511 | A1 | 10/2008 | Miura |
| 2009/0027937 | A1 | 1/2009 | Kirchmeier |
| 2009/0294816 | A1* | 12/2009 | Park ................. H01L 27/14603 257/292 |
| 2010/0135051 | A1 | 6/2010 | Mallwitz |
| 2010/0292945 | A1* | 11/2010 | Reynolds ............... G06F 3/044 702/65 |
| 2011/0050256 | A1 | 3/2011 | Frangen |
| 2011/0133788 | A1 | 6/2011 | Liu |
| 2011/0193848 | A1 | 8/2011 | Kojima |
| 2011/0221502 | A1* | 9/2011 | Meijer ............. G01R 31/31850 327/333 |
| 2011/0279409 | A1* | 11/2011 | Salaverry ............... G06F 3/0416 345/174 |
| 2012/0155086 | A1 | 6/2012 | Shimonishi et al. |
| 2013/0021294 | A1* | 1/2013 | Maharyta ............... G06F 3/0416 345/174 |
| 2013/0285971 | A1 | 10/2013 | Eltas et al. |
| 2013/0323942 | A1 | 12/2013 | Blondin |
| 2014/0103712 | A1 | 4/2014 | Blondin |
| 2014/0125357 | A1 | 5/2014 | Blondin |
| 2014/0145732 | A1* | 5/2014 | Blondin et al. |
| 2015/0035768 | A1 | 2/2015 | Shahparnia et al. |
| 2015/0035787 | A1* | 2/2015 | Shahparnia ............. G06F 3/044 345/174 |
| 2015/0035797 | A1 | 2/2015 | Shahparnia |
| 2015/0091850 | A1* | 4/2015 | Morein ................. G06F 3/0412 345/174 |
| 2015/0091851 | A1 | 4/2015 | Reynolds |
| 2015/0338958 | A1* | 11/2015 | Decaro ................. G06F 3/044 345/174 |
| 2016/0034102 | A1 | 2/2016 | Roziere et al. |
| 2016/0117017 | A1 | 4/2016 | Kremin et al. |
| 2016/0177385 | A1* | 6/2016 | Fife ..................... C12Q 1/6874 506/2 |
| 2016/0195977 | A1 | 7/2016 | Reynolds et al. |
| 2016/0196803 | A1* | 7/2016 | Reynolds ............. G06F 3/0412 345/174 |
| 2017/0003779 | A1* | 1/2017 | Reynolds ................ G06F 3/044 |
| 2017/0068352 | A1 | 3/2017 | Blondin et al. |
| 2017/0075495 | A1 | 3/2017 | Roberson et al. |
| 2017/0090615 | A1 | 3/2017 | Bohannon et al. |
| 2017/0108978 | A1 | 4/2017 | Blondin et al. |
| 2017/0262121 | A1* | 9/2017 | Kurasawa ........... G02F 1/13338 |
| 2017/0285859 | A1 | 10/2017 | Shepelev et al. |
| 2017/0315650 | A1 | 11/2017 | Reynolds |
| 2018/0032176 | A1 | 2/2018 | Krah |
| 2018/0074633 | A1 | 3/2018 | Kida et al. |
| 2018/0107309 | A1 | 4/2018 | Endo et al. |
| 2019/0073061 | A1 | 3/2019 | Krah |
| 2019/0102004 | A1 | 4/2019 | Krah |
| 2020/0019265 | A1 | 1/2020 | Krah et al. |
| 2020/0103992 | A1 | 4/2020 | Sauer et al. |

FOREIGN PATENT DOCUMENTS

| | | |
|---|---|---|
| FR | 2693555 A1 | 1/1994 |
| FR | 2756048 A1 | 5/1998 |
| FR | 2893711 A1 | 5/2007 |
| JP | H-04-015516 A | 1/1992 |
| JP | 9-280806 A | 10/1997 |
| JP | 11-304942 A | 11/1999 |
| JP | 11-304942 A | 11/1999 |
| JP | 2000-132319 A | 5/2000 |
| JP | 2000-163031 A | 6/2000 |
| JP | 2002-342033 A | 11/2002 |
| JP | 2011-053212 A | 3/2011 |
| KR | 10-2007-0042178 A | 4/2007 |
| KR | 10-2014-0043395 A | 4/2014 |
| WO | 2007/058727 A1 | 5/2007 |
| WO | WO-2007/060324 A1 | 5/2007 |
| WO | WO-2012/172240 A1 | 12/2012 |
| WO | WO-2012/172241 A1 | 12/2012 |
| WO | 2015/017196 A1 | 2/2015 |
| WO | WO-2018/023089 A1 | 2/2018 |
| WO | 2019067267 A1 | 4/2019 |
| WO | 2019067268 A1 | 4/2019 |

OTHER PUBLICATIONS

International Search Report dated Jan. 7, 2019, for PCT Application No. PCT/US2018/051587, five pages.

International Search Report dated Jan. 11, 2019, for PCT Application No. PCT/US2018/051588, five pages.

International Search Report dated Oct. 27, 2017, for PCT Application No. PCT/US2017/044545, six pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Notice of Allowance dated Jul. 5, 2018, for U.S. Appl. No. 15/663,271, filed Jul. 28, 2017, ten pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

(56) References Cited

OTHER PUBLICATIONS

Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
International Preliminary Report on Patentability received for PCT Patent Application No. PCT/US2017/044545, dated Feb. 7, 2019, 9 pages.
Non-Final Office Action received for U.S. Appl. No. 16/134,651, dated Nov. 29, 2019, 10 pages.
Non-Final Office Action received for U.S. Appl. No. 16/581,721, dated Oct. 30, 2019, 10 pages.
Notice of Allowance received for U.S. Appl. No. 16/179,565, dated Jun. 6, 2019, 7 pages.
Written Opinion received for PCT Patent Application No. PCT/US2018/051587, dated Jan. 7, 2019, 8 pages.
Written Opinion received for PCT Patent Application No. PCT/US2018/051588, dated Jan. 11, 2019, 8 pages.
Notice of Allowance received for U.S. Appl. No. 16/581,721, dated Apr. 22, 2020, 5 pages.
Final Office Action received for U.S. Appl. No. 16/134,651, dated Aug. 7, 2020, 13 pages.
Notice of Allowance received for U.S. Appl. No. 16/581,721, dated Aug. 4, 2020, 5 pages.
Non-Final Office Action received for U.S. Appl. No. 16/530,938, dated Jun. 29, 2020, 15 Pages.

\* cited by examiner

MULTI-POWER DOMAIN TOUCH SENSING

CROSS REFERENCE TO RELATED APPLICATION

This application claims the benefit under 35 U.S.C. 119(e) of U.S. Provisional Patent Application No. 62/566,089, filed Sep. 29, 2017 the contents of which are incorporated herein by reference in their entirety for all purposes.

FIELD OF THE DISCLOSURE

This relates generally to a touch and/or proximity detection device and more particularly to a touch and/or proximity detection device including touch sensing circuitry divided between multiple power domains.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes or sensing electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some cases, parasitic or stray capacitances can exist between the sensing electrodes used for sensing touch on the touch sensor panels, and other components of the devices in which the touch sensor panels are included, which can be referenced to a chassis or earth ground. These parasitic or stray capacitances can introduce errors and/or offsets into the touch outputs of the touch sensor panels. Therefore, it can be beneficial to reduce or eliminate such parasitic or stray capacitances.

SUMMARY OF THE DISCLOSURE

This relates generally to a touch and/or proximity detection device and more particularly to a proximity detection device including touch sensing circuitry operating across multiple power domains. In some examples, the touch and/or proximity detection device can include guard circuitry referenced to an earth or chassis ground and touch sensing circuitry referenced to guard ground. The guard circuitry can include a voltage driver configured to produce a guard signal, a plurality of differential amplifiers configured to subtract the guard signal from a touch signal, and a plurality of ADCs configured to convert one or more analog touch signals to one or more digital touch signals, for example. The touch sensing circuitry can include a plurality of sense amplifiers referenced to guard ground and configured to sense a signal of a touch node electrode of a touch screen. The touch screen can further include one or more shielding electrodes coupled to the guard signal and configured to mitigate stray capacitance at the touch node electrodes and/or at one or more routing traces coupled to the touch node electrodes.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to a touch and/or proximity detection device and more particularly to a proximity detection device including touch sensing circuitry operating across multiple power domains. In some examples, the touch and/or proximity detection device can include guard circuitry referenced to an earth or chassis ground and touch sensing circuitry referenced to guard ground. The guard circuitry can include a voltage driver configured to produce a guard signal, a plurality of differential amplifiers configured to subtract the guard signal from a touch signal, and a plurality of ADCs configured to convert one or more analog touch signals to one or more digital touch signals, for example. The touch sensing circuitry can include a plurality of sense amplifiers referenced to guard ground and configured to sense a signal of a touch node electrode of a touch screen. The touch screen can further include one or more shielding electrodes coupled to the guard signal and configured to mitigate stray capacitance at the touch node electrodes and/or at one or more routing traces coupled to the touch node electrodes.

Figure 1A:
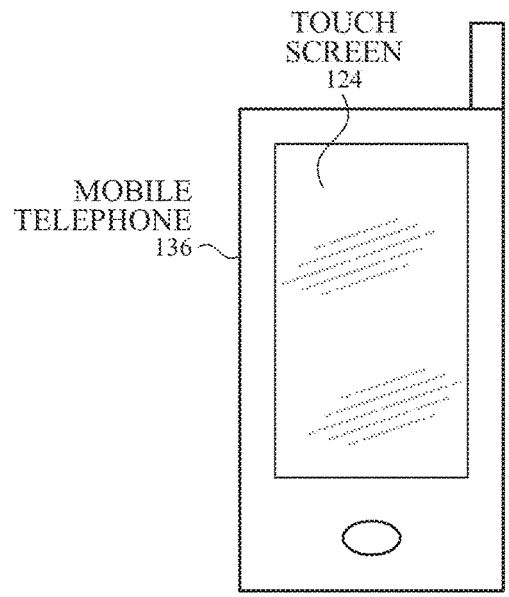
FIGS. 1A-1D illustrate an example mobile telephone, an example media player, an example personal computer and an example tablet computer that can each include an exemplary touch screen according to examples of the disclosure.
Figure 1B:
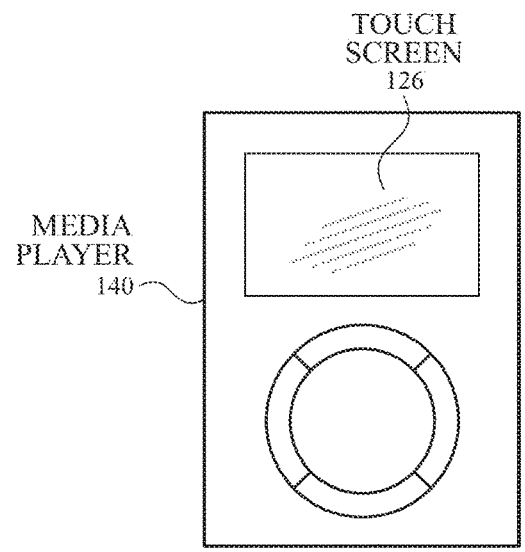
Figure 1C:
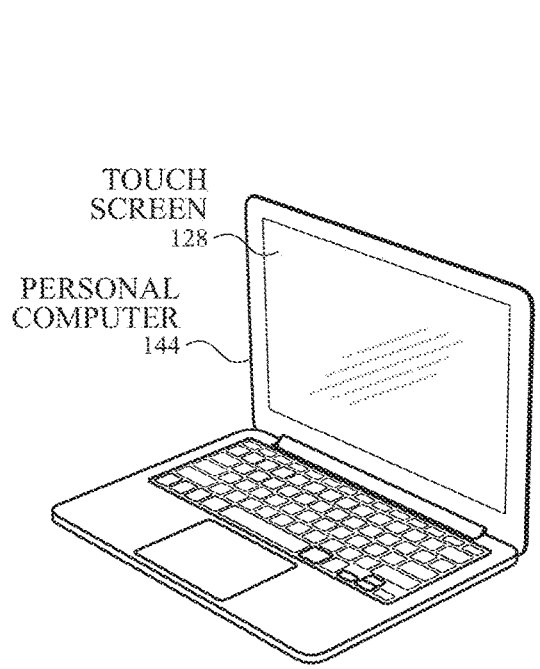
Figure 1D:
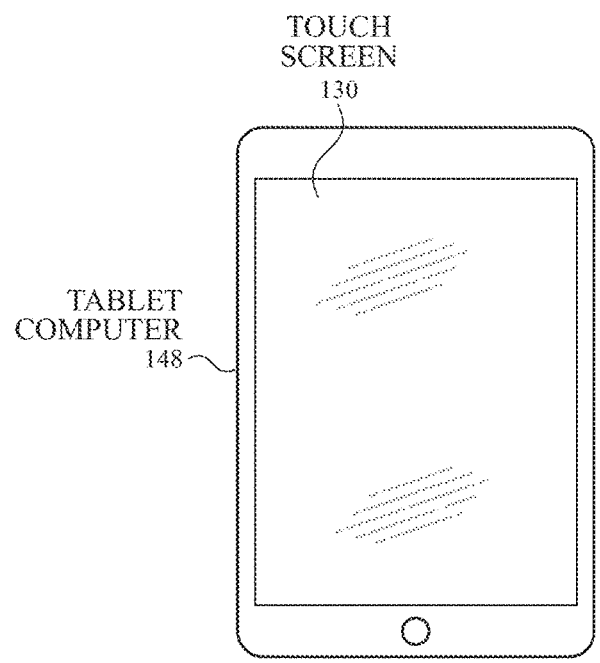

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices. Additionally it should be understood that the disclosure herein is not limited to touch screens, but applies as well to touch sensor panels without a corresponding display.

In some examples, touch screens 124, 126, 128 and 130 can be based on self-capacitance. A self-capacitance based touch system can include a matrix of small, individual plates of conductive material that can be referred to as touch node electrodes (as described below with reference to touch screen 220 in FIG. 2 and with reference to touch screen 402 in FIG. 4B). For example, a touch screen can include a plurality of individual touch node electrodes, each touch node electrode identifying or representing a unique location (e.g., a touch node) on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material (as described below with reference to touch screen 400 in FIG. 4A), and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance based touch system can include electrodes arranged as drive and sense lines that may cross over each other on different layers, or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In some examples, the electrodes of a mutual-capacitance based touch system can be formed from a matrix of small, individual plates of conductive material, and changes in the mutual capacitance between plates of conductive material can be detected, similar to above.

In some examples, touch screens 124, 126, 128 and 130 can be based on mutual capacitance and/or self-capacitance. The electrodes can be arrange as a matrix of small, individual plates of conductive material (e.g., as in touch screen 402 in FIG. 4B) or as drive lines and sense lines (e.g., as in touch screen 400 in FIG. 4B), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
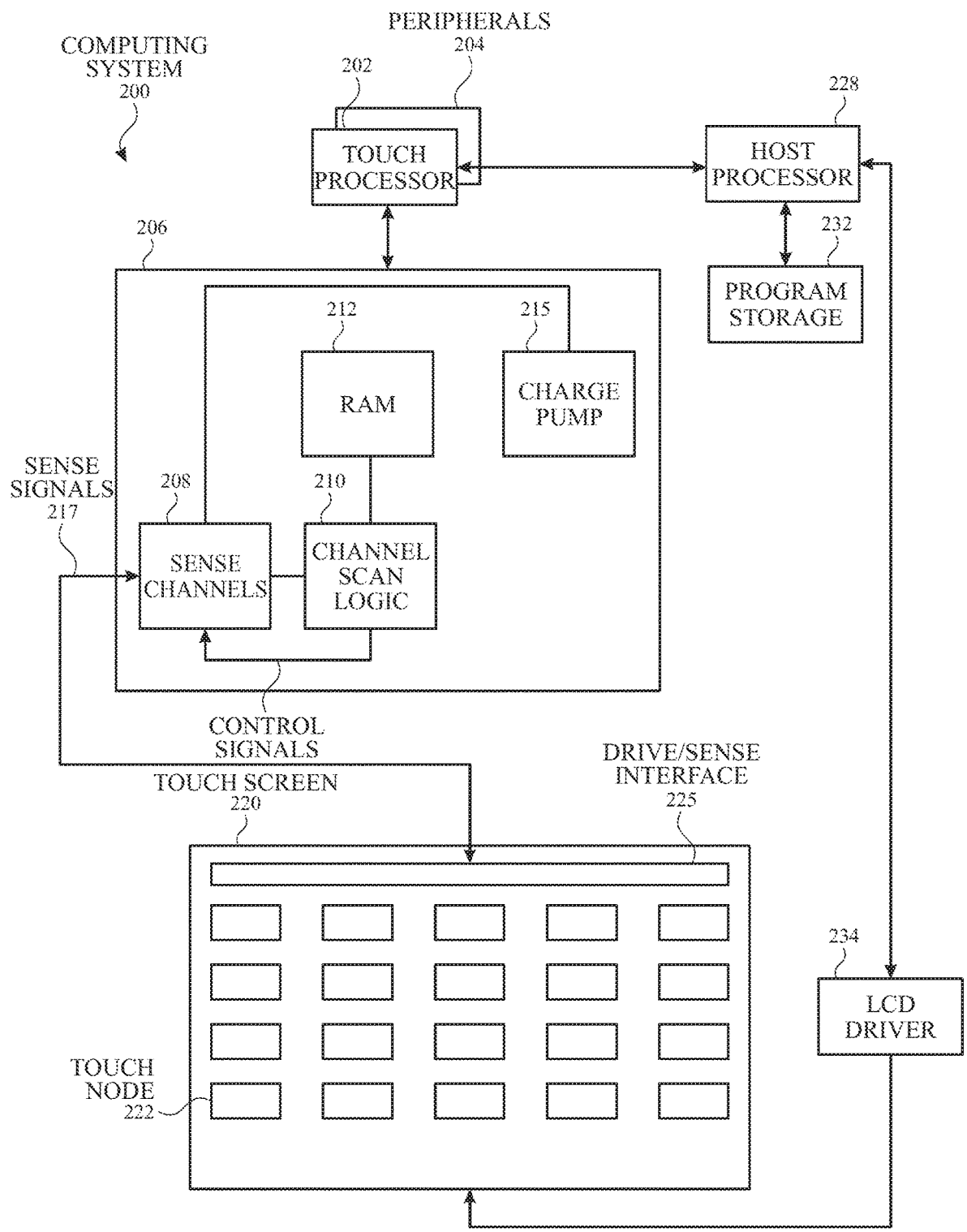
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above, though the examples of the disclosure will be described assuming a self-capacitance touch screen is provided. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself. As described in more detail below, in some examples the sense channel and/or other components of touch controller 206 and touch processor 202 can be implemented across multiple power domains.

Touch screen 220 can be used to derive touch information at multiple discrete locations of the touch screen, referred to herein as touch nodes. For example, touch screen 220 can include touch sensing circuitry that can include a capacitive sensing medium having a plurality of electrically isolated touch node electrodes 222 (e.g., a plurality of touch node electrodes of pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. As used herein, an electrical component "coupled to" or "connected to" another electrical component encompasses a direct or indirect connection providing electrical path for communication or operation between the coupled components. Thus, for example, touch node electrodes 222 may be directly connected to sense channels or indirectly connected to sense channels via drive/sense interface 225, but in either case provided an electrical path for driving and/or sensing the touch node electrodes 222. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen). In such examples, each touch node electrode in a pixelated self-capacitance touch screen can be sensed for the corresponding touch node represented in the touch image.

Computing system 200 can also include a host processor 228 for receiving outputs from touch processor 202 and performing actions based on the outputs. For example, host processor 228 can be connected to program storage 232 and a display controller, such as an LCD driver 234 (or an LED display or OLED display driver). The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
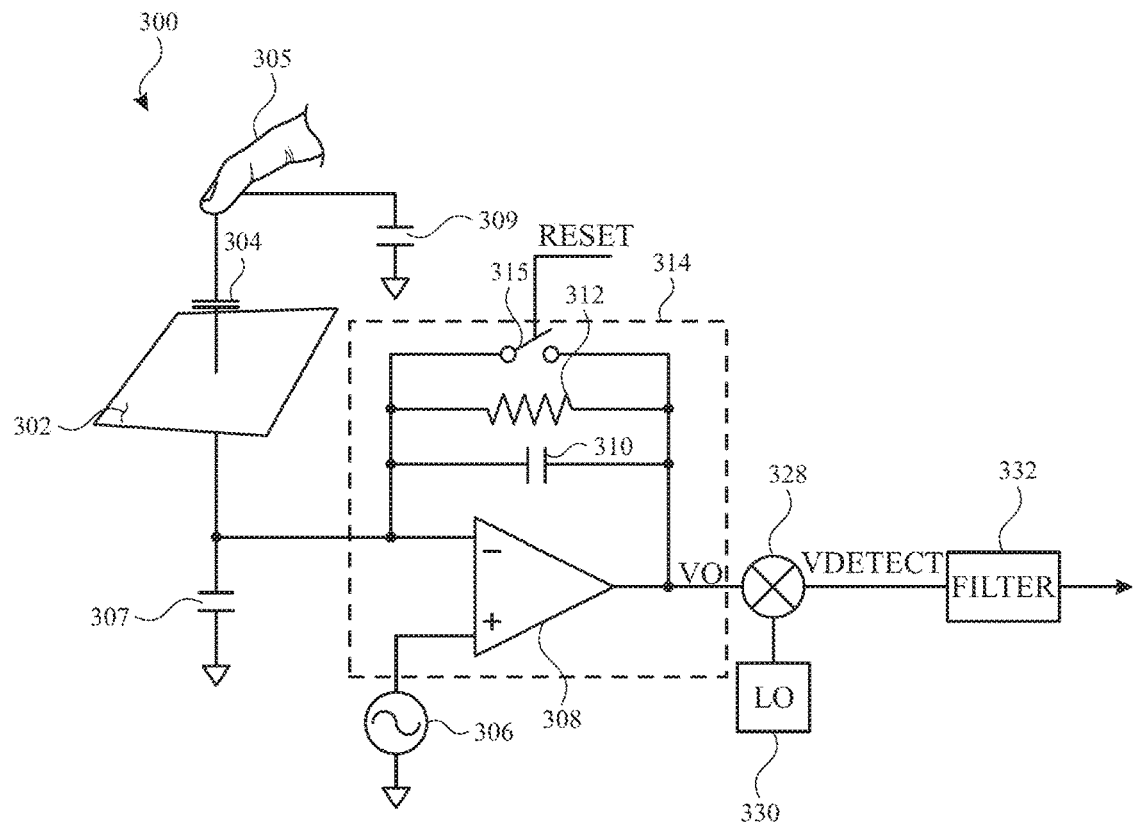
FIG. 3A illustrates an exemplary touch sensor circuit corresponding to a self-capacitance sensing electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
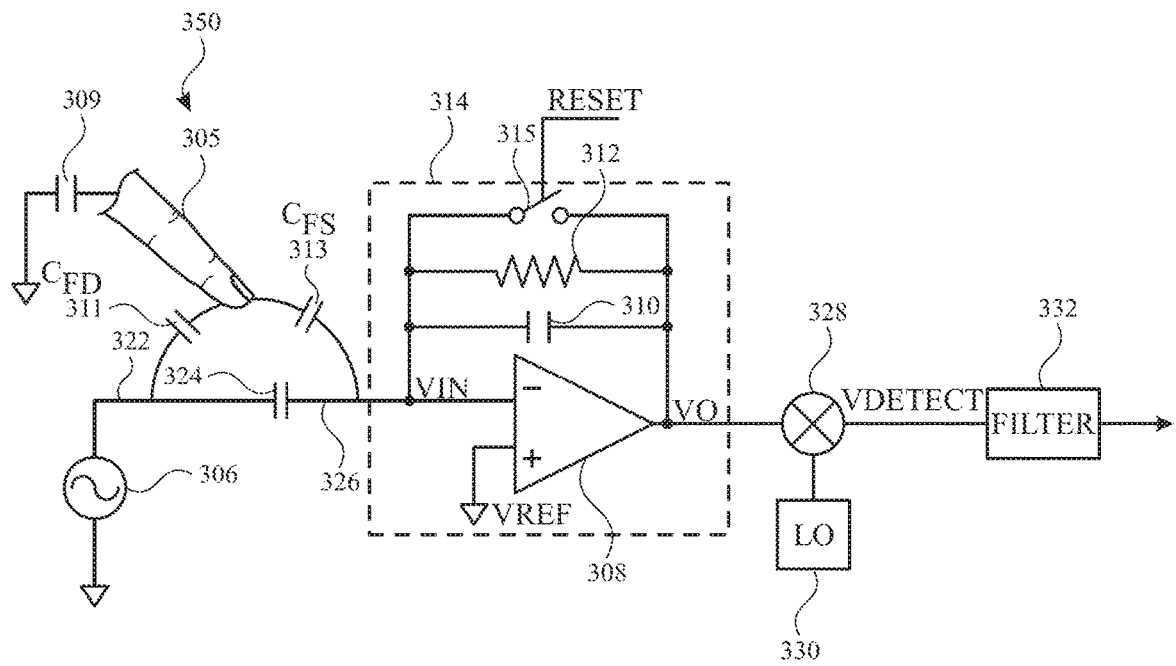
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
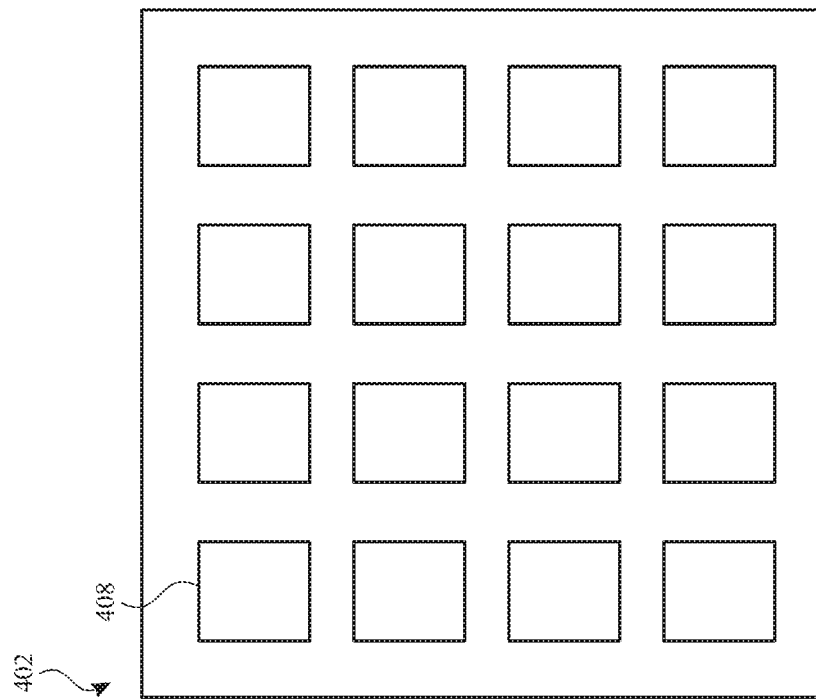
FIG. 4B illustrates a touch screen with sensing electrodes arranged in a pixelated sensing electrode configuration according to examples of the disclosure.
Figure 4A:
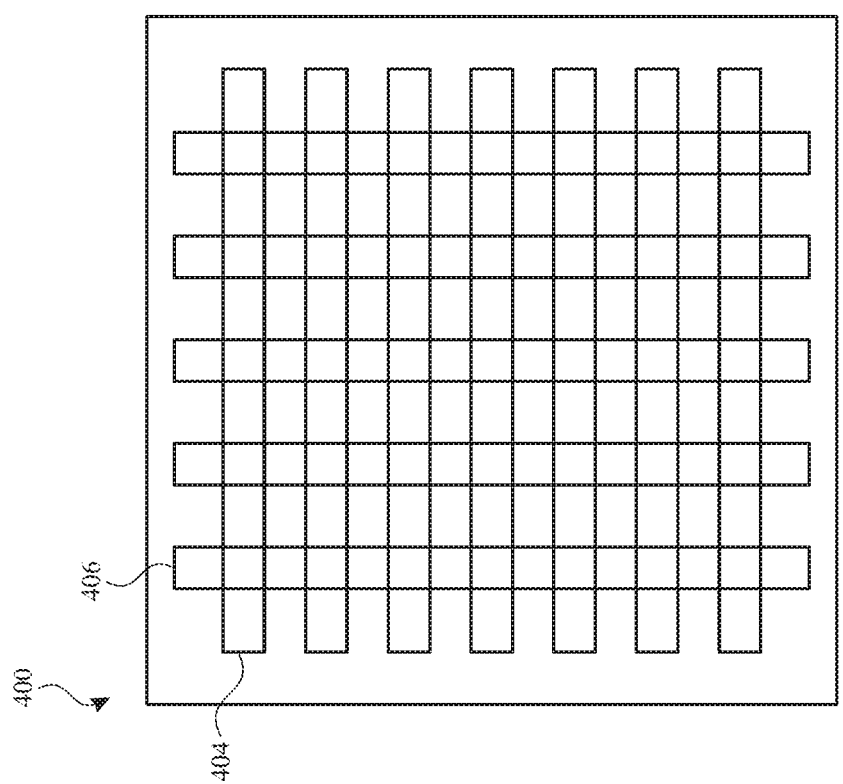
FIG. 4A illustrates a touch screen with sensing electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 400. In some examples, touch screen 400 can sense the self-capacitance of touch node electrodes 408 to detect touch and/or proximity activity on touch screen 400, and in some examples, touch screen 400 can sense the mutual capacitance between touch node electrodes 408 to detect touch and/or proximity activity on touch screen 400.

In some examples, the touch sensing circuitry of a touch screen or touch sensor panel (e.g., touch sensing circuitry as described with reference to FIGS. 2 and 3A-3B) can be fabricated in an electronic chip (e.g., an integrated circuit, etc.), and the electronic chip and/or the circuitry included in the electronic chip can operate with respect to a reference voltage provided by the chassis of the electronic device ("chassis ground") in which the touch screen or touch sensor panel is included (e.g., devices 136, 140, 144 and 148 in FIGS. 1A-1D). In some examples this chassis ground can be a grounding pathway from the chassis through a user operating the electronic device to earth ground. In some examples, this chassis ground can be the same as earth ground. However, in some examples, operating the electronic chip and/or the circuitry included in the electronic chip with respect to chassis or earth ground can result in undesirable touch sensing performance, as will be described in more detail below.

Figure 5A:
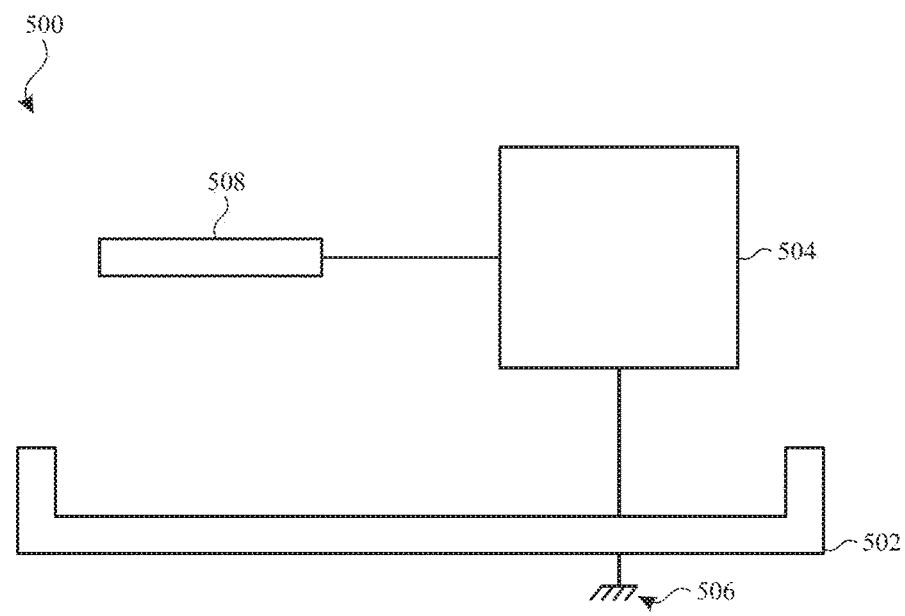
FIGS. 5A-5B illustrate an exemplary touch sensor panel configuration in which the touch sensing circuitry of the touch sensor panel is included in an electronic chip (e.g., an integrated circuit, etc.) that is referenced to earth or chassis ground according to examples of the disclosure.
Figure 5B:
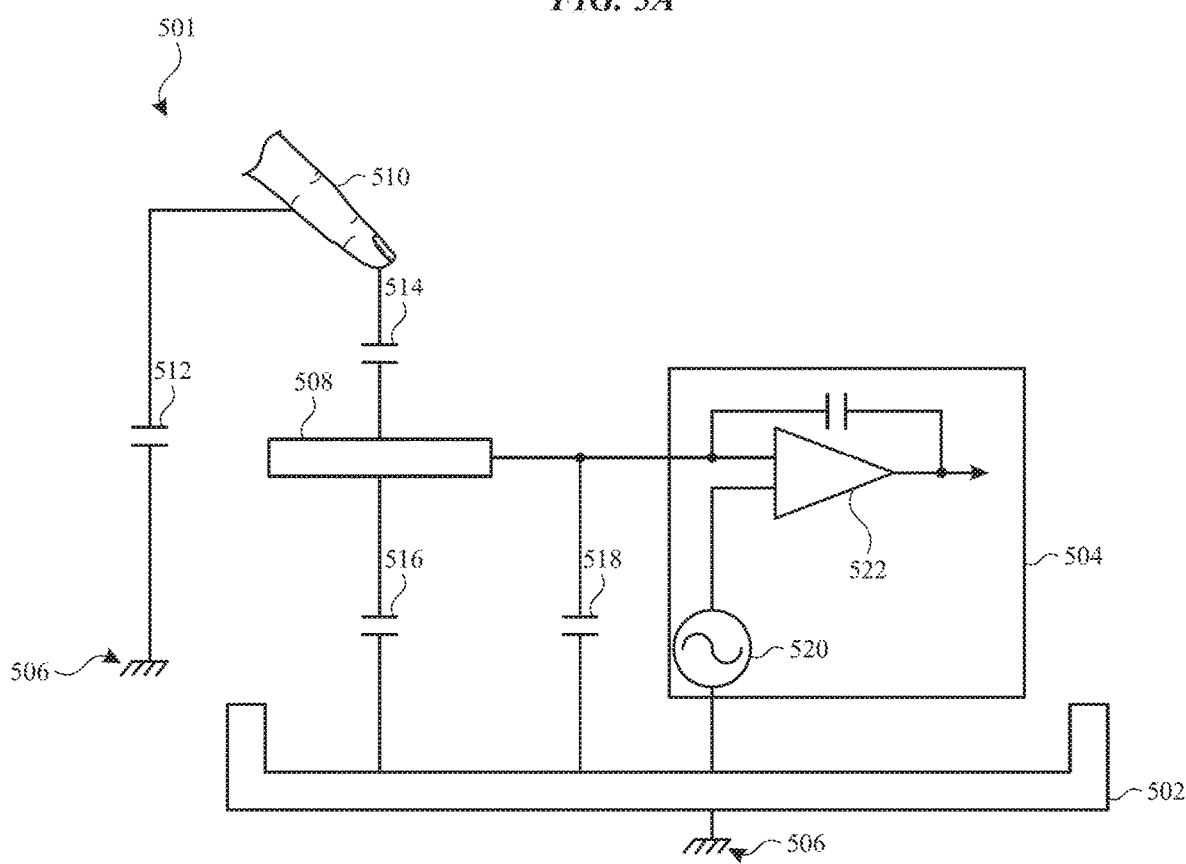

FIGS. 5A-5B illustrate an exemplary touch sensor panel configuration 500 in which the touch sensing circuitry of the touch sensor panel is included in an electronic chip (e.g., an integrated circuit, etc.) that is referenced to earth or chassis ground according to examples of the disclosure. Specifically, in configuration 500 of FIG. 5A, a touch sensor panel is included in a device (e.g., devices 136, 140, 144 and 148 in FIGS. 1A-1D) having device chassis 502. Chassis 502 can be grounded to earth ground 506, or can be grounded to a separate device ground (not illustrated). Chassis 502 can include electronic chip 504, which can include touch sensing circuitry for sensing touch on the touch sensor panel included in the device of FIG. 5A. For example, chip 504 can include touch controller 206 and/or touch processor 202 of FIG. 2 and/or the touch sensing circuits of FIGS. 3A-3B. Chip 504 and/or the touch sensing circuitry in chip 504 can be referenced to chassis 502 (e.g., referenced to earth ground 506). Chip 504 can be coupled, via one or more traces, to touch node electrode 508, which can be a touch node electrode included in the touch sensor panel of the device of FIG. 5A. Chip 504 can also be coupled to other touch node electrodes included in the touch sensor panel, though a single touch node electrode 508 is illustrated for ease of description. Chip 504 can measure the self-capacitance of touch node electrode 508 to detect proximity activity at touch node electrode 508, as discussed with reference to FIG. 3A.

FIG. 5B illustrates various capacitances associated with proximity detection using touch sensor panel configuration 500 of FIG. 5A according to examples of the disclosure. Specifically, finger (or object) 510 can be in proximity to touch node electrode 508. Finger 510 can be grounded to earth ground 506 through capacitance 512 (e.g., $C_{body}$), which can represent a capacitance from finger 510 through a user's body to earth ground 506. Capacitance 514 (e.g., $C_{touch}$) can represent a capacitance between finger 510 and touch node electrode 508, and can be the capacitance of interest in determining how close finger 510 is to touch node electrode 508. Capacitance 514 can be measured by sense circuitry 522 (e.g., as described with reference to FIG. 3A) included in chip 504 to determine an amount of touch at touch node electrode 508. However, because touch node electrode 508 can be included in chassis 502, which can be grounded to earth ground 506, parasitic or stray capacitances can exist between touch node electrode 508 and chassis 502 (represented by capacitance 516 (e.g., $C_p$)) and/or between traces that connect touch node electrode 508 to sense circuitry 522 and chassis 502 (represented by capacitance 518 (e.g., $C_s$)). These parasitic or stray capacitances 516 and 518 can also be measured by sense circuitry 522, and can create an offset (e.g., from zero output signal) in the output signal of sense circuitry 522, which can reduce the signal to noise ratio and/or the dynamic range of sense circuitry 522. This, in turn, can reduce the range of touch-related capacitances (e.g., $C_{touch}$ 514) that sense circuitry 522 can detect, thus potentially limiting the touch sensing performance of the touch sensor panel in which touch node electrode 508 is included.

In order to reduce or eliminate parasitic or stray capacitances that may be measured by sense circuitry in a touch sensing chip of a touch sensor panel, a guard plane can be established between the touch-related components of the touch sensor panel (e.g., touch node electrode 508, touch sensing chip 504, etc.) and chassis 502. The guard plane, including the touch sensing chip (e.g., integrated circuit, etc.), can be referenced to a guard potential that can mirror or be the same as the stimulation signal used to stimulate the touch node electrodes on the touch sensor panel. In this way, the voltages on both sides of the above-described parasitic or stray capacitances can mirror each other, causing those capacitances to fall out of the touch sensing measurements performed by the touch sensing circuitry in the touch sensing chip. As a result, the signal portion (out of sense amplifier 522) associated with the undesired stray capacitances can be largely reduced, therefore improving the touch dynamic range and the touch sensing performance of the touch sensor panel. It should be understood that "guard plane" need not refer to a planar element or electrode; rather, the guard planes of the disclosure can be implemented in any number of manners, including being non-planar, being composed of one or more portions of the device that are driven/maintained at a guard potential, and being implemented in different ways in different parts of the device (e.g., as part of a flex circuit in one portion of the device, as part of the touch sensor panel in another portion of the device, etc.).

Figure 6A:
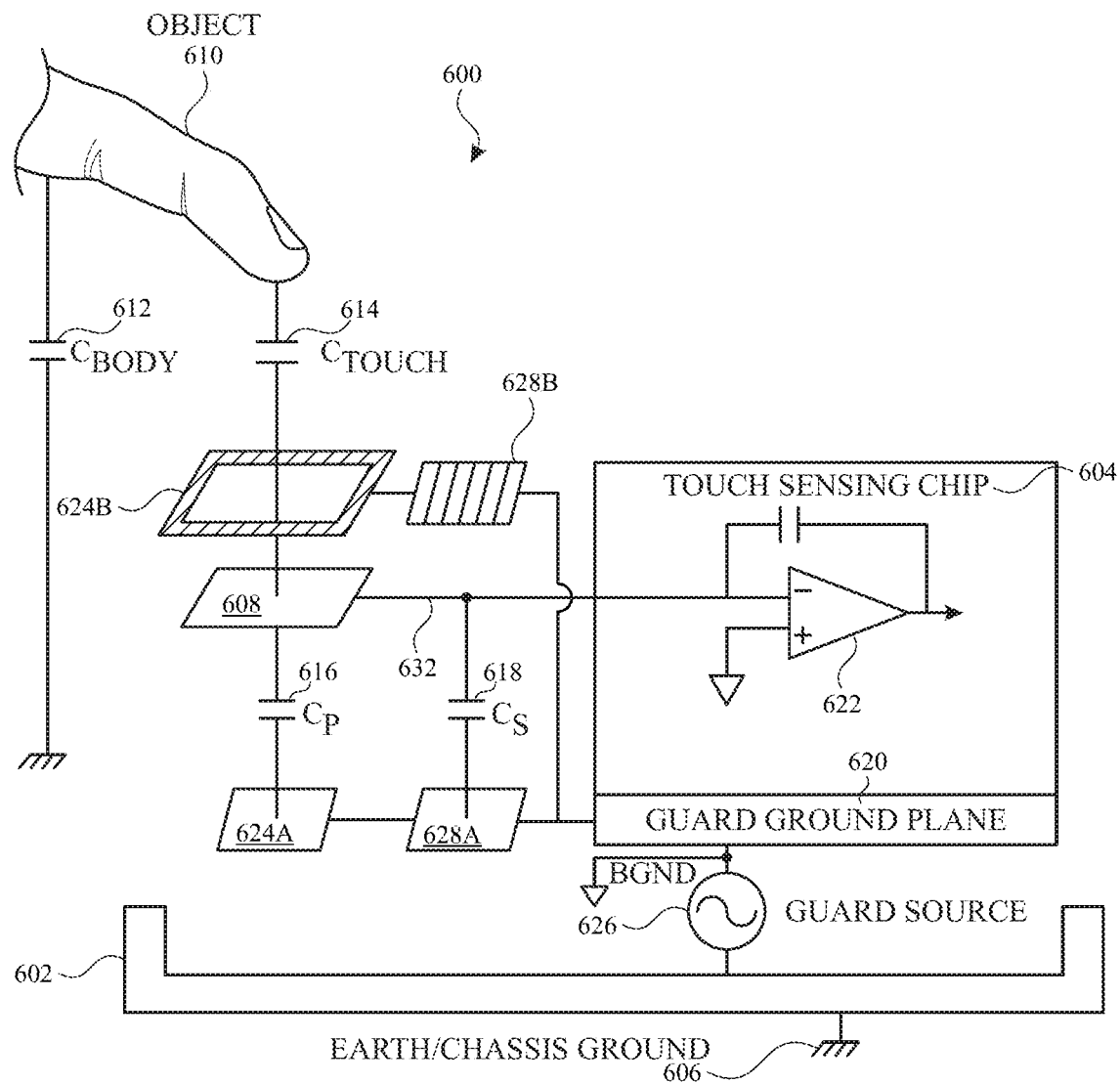
FIG. 6A illustrates an exemplary touch sensor panel configuration including various capacitances associated with exemplary touch sensor panel configuration according to examples of the disclosure.

FIG. 6A illustrates an exemplary touch sensor panel configuration 600 including various capacitances associated with exemplary touch sensor panel configuration 600 according to examples of the disclosure. In the configuration of FIG. 6A, the touch sensing circuitry of the touch sensor panel is included on an electronic chip (e.g., an integrated circuit, etc.) that is referenced to a guard ground rather than a chassis or earth ground. Specifically, in configuration 600 of FIG. 6A, touch sensing circuitry in touch sensing chip 604 (also referred to herein as "touch controller") can be coupled to touch node electrodes in a touch sensor panel by routing traces. As a representative example, touch node electrode 608 in FIG. 6A can be coupled to touch sensing circuitry 622 by routing trace 632. The routing traces can be included on a flex circuit that couples touch sensing chip 604 to touch sensor panel. Touch sensing chip 604 can be disposed or fabricated on guard plane 620, which can represent a virtual ground plane of touch sensing chip 604 that is different from chassis or earth ground 606. In particular, stimulation source 626 ("guard source") can be referenced to chassis or earth ground 606, and can output a guard voltage (e.g., a guard stimulation signal, such as a square or trapezoid wave) that can establish the voltage at guard plane 620. In this manner, the guard plane 620 can be referenced to the guard voltage, acting as a guard ground for touch sensing chip 604. Stimulation source 626 can be included on a chip, separate from touch sensing chip 604. Because touch sensing chip 604 can be built on guard plane 620, the circuitry (e.g., touch sensing circuitry) included in touch sensing chip 604 can be referenced to the guard signal, and can be isolated from chassis or earth ground 606 by guard plane 620. In other words, touch sensing chip 604 and the chip in which guard source 626 is included can operate in different "power domains": touch sensing chip 604 can operate in the guard power domain, and guard source 626 can operate in the chassis or earth power domain. Guard plane 620 can be any conductive material on which touch sensing chip 604 can be disposed or fabricated (e.g., silver, copper, gold, etc.). For example, touch sensing chip 604 may be assembled on a flex circuit or printed circuit board (PCB), and may be referenced to the flex circuit or PCB ground layer 620 driven by guard source 626. Guard source can be implemented, for example, using a waveform generator (e.g., generating arbitrary waveforms, such as a square wave, and can be referenced to earth ground 606) whose output can be inputted in to a digital-to-analog converter (DAC). Analog output from the DAC can be provided to a linear buffer (e.g., with unity or some other gain) whose output can correspond to the output of guard source 626.

Additionally, a guard plane 624A can be disposed between touch node electrode 608 and chassis 602 (or, more generally, earth ground 606), and guard plane 628A can be disposed between routing traces that couple touch node electrode 608 to touch sensing chip 604 and chassis 602 (or, more generally, earth ground 606). Guard plane 624A and guard plane 628A can also be stimulated by the same guard voltage as is guard plane 620. These guard planes 624A and 628A can similarly isolate touch node electrode 608 and traces that couple touch node electrode 608 to touch sensing chip 604 from chassis or earth ground 606. One or more of guard planes 620, 624 and 628 can reduce or eliminate parasitic or stray capacitances that may exist between touch node electrode 608 and chassis or earth ground 606, as will be described below. Optionally guard plane 624B and guard plane 628B, both referenced to the same guard voltage, can be disposed on an opposite side of touch node electrode 608 and routing trace 632. For example, a flex circuit including routing (e.g., routing trace 632) between the touch sensing chip 604 and touch node electrodes (e.g., touch node electrode 608) can include guard plane 628B on top of routing trace 632 and guard plane 628A on bottom of routing trace 632 to sandwich trace 632 on both sides. The touch sensor panel can also include a guard plane 624A and guard plane 624B sandwiching touch node electrode 608 (and similar for other touch node electrodes in the touch sensor panel). Guard plane 624B can include openings corresponding to touch node electrodes to enable detection of touch activity on the touch sensor panel (or proximity activity) while guarding the routing in the touch sensor panel from stray capacitances that can form due to a touch or other stray capacitances. In some examples, the top and/or bottom guard planes can be positioned completely or partially between one or more touch node electrodes and one or more noise sources, such as a display. In some examples, the material(s) out of which guard planes 628A-B are made in the flex circuit can be different than the material(s) out of which guard planes 624A-B are made in touch sensor panel 630. For example, guard planes 624A-B in touch sensor panel can be made of the same material that touch node electrodes 608 are made of (e.g., ITO, or another fully or partially transparent conductor), and guard planes 628A-B in the flex circuit can be made of a different conductor, such as copper, aluminum, or other conductor that may or may not be transparent.

Various capacitances associated with touch and/or proximity detection using touch sensor panel configuration 600 are also shown in FIG. 6A. Specifically, an object 610 (e.g., a finger) can be in proximity to touch node electrode 608. Object 610 can be grounded to earth ground 606 through capacitance 612 (e.g., $C_{body}$), which can represent a capacitance from object 610 through a user's body to earth ground 606. Capacitance 614 (e.g., $C_{touch}$) can represent a capacitance between object 610 and touch node electrode 608, and can be the capacitance of interest in determining how close object 610 is to touch node electrode 608. Typically, $C_{body}$ 612 can be significantly larger than $C_{touch}$ 614 such that the equivalent series capacitance seen at touch node electrode 608 through object 610 can be approximately $C_{touch}$ 614. Capacitance 614 can be measured by touch sensing circuitry 622 (e.g., as described with reference to FIG. 3A) included in touch sensing chip 604 to determine an amount of touch at touch node electrode 608 based on the sensed touch signal. As shown in FIG. 6A, touch sensing circuitry 622 can be referenced to guard ground. Although illustrated with the non-inverting input of the sense amplifier coupled to the guard ground, in some example, additional bias voltage referenced to guard ground (not shown) can be included. In some examples, capacitance 616 (e.g., $C_p$) can be a parasitic capacitance between one or more touch node electrodes 608 and guard plane 624A. Capacitance 618 (e.g., $C_s$) can be a stray capacitance between routing trace 632 coupled to touch node electrode 608 and guard plane 628, for example. In some examples, the impact of capacitances 616 and 618 on a sensed touch signal can be mitigated because guard planes 624A and 628A and touch sensing circuitry 622 are all coupled to the virtual ground signal produced by guard source 626.

When guarded, the voltage at touch node electrode 608 and trace 632 can mirror or follow the voltage at guard planes 624A and 628A, and thereby capacitances 616 and 618 can be reduced or eliminated from the touch measurements performed by touch sensing circuitry 622. Without stray capacitances 616 and 618 affecting the touch measurements performed by touch sensing circuitry 622, the offset in the output signal of sense circuitry 622 (e.g., when no touch is detected at touch node electrode 608) can be greatly reduced or eliminated, which can increase the signal to noise ratio and/or the dynamic range of sense circuitry 622. This, in turn, can improve the ability of touch sensing circuitry 622 to detect a greater range of touch at touch node electrode 608, and to accurately detect smaller capacitances $C_{touch}$ 614 (and, thus, to accurately detect proximity activity at touch node electrode 608 at larger distances). Additionally, with a near-zero offset output signal from touch sensing circuitry 622, the effects of drift due to environmental changes (e.g., temperature changes) can be greatly reduced. For example, if the signal out of sense amplifier 622 consumes 50% of its dynamic range due to undesirable/un-guarded stray capacitances in the system, and the analog front end (AFE) gain changes by 10% due to temperature, the sense amplifier 622 output may drift by 5% and the effective signal-to-noise ratio (SNR) can be limited to 26 dB. By reducing the undesirable/un-guarded stray capacitances by 20 dB, the effective SNR can be improved from 26 dB to 46 dB.

Figure 6B:
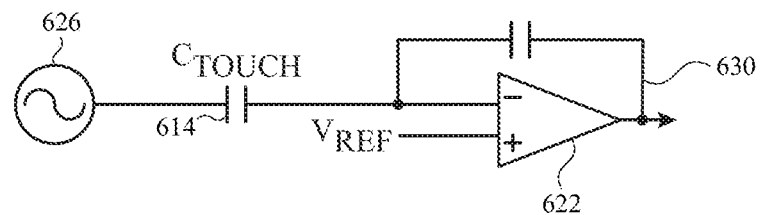
FIG. 6B illustrates an exemplary equivalent circuit diagram of an exemplary touch sensor panel configuration according to examples of the disclosure.

FIG. 6B illustrates an exemplary equivalent circuit diagram of an exemplary touch sensor panel configuration 630 according to examples of the disclosure. As described herein, guarding can reduce or eliminate capacitances 616 and 618 from the touch measurements performed by touch sensing circuitry 622. As a result, the sense amplifier 622 can simply detect $C_{touch}$ 614, which can appear as a virtual mutual capacitance between object 610 and touch node electrode 608. Specifically, object 610 can appear to be stimulated (e.g., via $C_{body}$ 612) by guard source 626, and object 610 can have $C_{touch}$ 614 between it and the inverting input of sense circuitry 622. Changes in $C_{touch}$ 614 can, therefore, be sensed by sense circuitry 622 as changes in the virtual mutual capacitance $C_{touch}$ 614 between object 610 and sense circuitry 622 (e.g., as described with reference to sense circuitry 314 in FIG. 3B). As such, the offset in the output signal of sense circuitry 622 (e.g., when no touch is detected at touch node electrode 608) can be greatly reduced or eliminated, as described above. As a result, sense circuitry 622 (e.g., the input stage of sense circuitry 622) need not support as great a dynamic input range that self-capacitance sense circuitry (e.g., sense circuitry 314 in FIG. 3A) might otherwise need to support in circumstances/configurations that do not exhibit the virtual mutual capacitance effect described here.

Because the self-capacitance measurements of touch node electrodes in self-capacitance based touch screen configurations can exhibit the virtual mutual capacitance characteristics described above, in some examples, touch sensing chip 604 need not be a chip designed to support self-capacitance measurements (e.g., touch sensing chip 604 may not include sense circuitry 314 as described in FIG. 3A). Instead, touch sensing chip 604 may be a mutual capacitance touch sensing chip designed to support mutual capacitance measurements (e.g., touch sensing chip 604 may include sense circuitry 314 as described in FIG. 3B, but not sense circuitry 314 as described in FIG. 3A). In such examples, guard source 626 can be appropriately designed and used with the mutual capacitance touch sensing chip in various configurations of this disclosure (e.g., configuration 600) to effectively achieve the guarded self-capacitance functionality of this disclosure despite touch sensing chip 604 being designed as a mutual capacitance touch sensing chip, rather than as a self-capacitance touch sensing chip. For example, referring to FIG. 3B, stimulation source 306 (e.g., guard source 626) can stimulate the guard plane(s) of the disclosure, which can act as the drive electrodes in the virtual mutual capacitance configuration described here. The touch node electrodes of the touch sensor panel can then, in turn, be treated as the sense electrodes in the virtual mutual capacitance configuration described here, and can be coupled to the input of sense amplifier 308 in FIG. 3B. Touch sensing circuitry 314 in FIG. 3B can then sense the mutual capacitance between the guard plane(s) and the touch node electrodes, which can be represented by the circuit configuration of FIG. 6B.

Figure 7A:
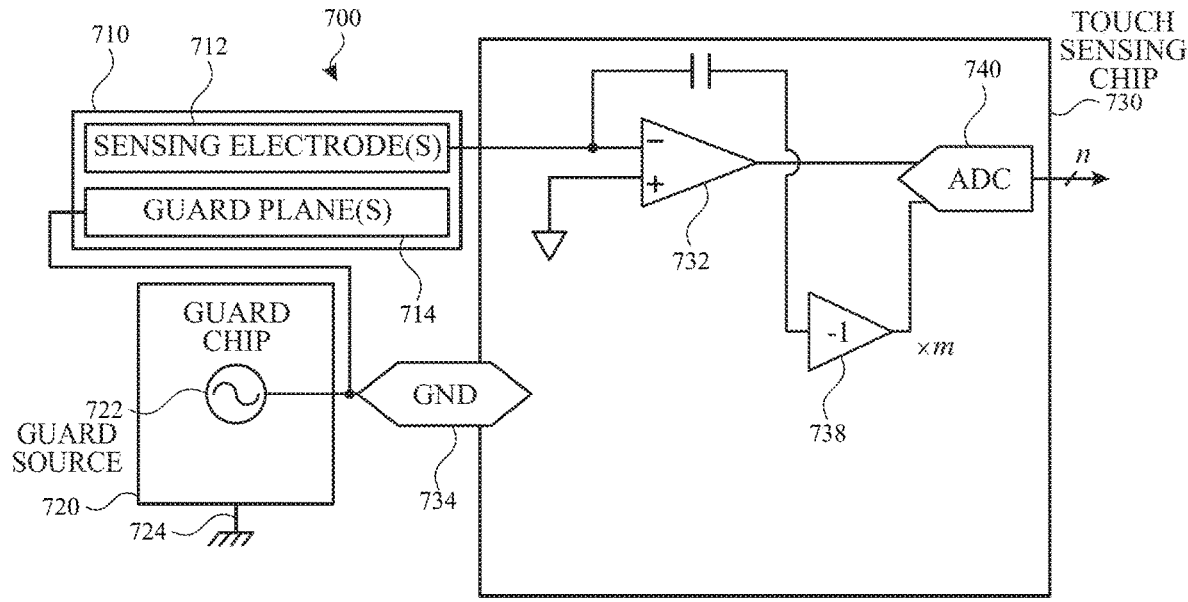
FIG. 7A illustrates an exemplary touch and/or proximity detection system according to examples of the disclosure.

As discussed herein, in some examples, touch sensing circuitry and guard circuitry (e.g., to generate a guard voltage) for a guarded touch sensor panel can be implemented with separate electronic chips or integrated circuits operating in multiple power domains. FIG. 7A illustrates an exemplary touch and/or proximity detection system 700 according to examples of the disclosure. Touch and proximity detection system 700 illustrated in FIG. 7A includes guarded touch sensor panel 710, guard chip 720, and touch sensing chip 730. Touch sensor panel 710 (e.g., implemented in touch screen 124, 126, 128, or 130) can include one or more touch node electrodes 712 (such as touch node electrode 608) and one or more guard planes 714 (such as guard plane 624A), for example. In some examples, guard chip 720 can include voltage driver 722 (e.g., guard source 626) configured to output a guard voltage signal. Guard chip 720 can be referenced to earth or chassis ground 724 (i.e., guard chip 720 and its internal circuitry can operate in the earth or chassis ground power domain). Touch sensing chip 730 can be referenced to the guard voltage output from guard chip 720. Touch sensing chip 730 can include various touch sensing circuitry operating in the guarded power domain. The touch sensing circuitry can include sense amplifier 732 referenced to the guard voltage and an analog-to-digital converter (ADC) 740 configured to convert the output of sense amplifier 732 into a digital signal for further processing. As illustrated in FIG. 7A, ADC 740 can be a differential ADC in which one input can be the output of sense amplifier 732 and the second input can be an inverted version of the output of sense amplifier (e.g., provided by inverter 738). For example, inverter 738 can convert a single-ended touch signal to a differential signal, thereby doubling the voltage swing of the touch signal into the ADC. In some examples, ADC 740 can be a single-ended ADC and inverter 738 can be omitted. A differential ADC can have twice the input range as a single-sided ADC in some examples. Touch sensing chip 730 can include additional components not illustrated in FIG. 7A, such as a microcontroller (e.g., corresponding to touch processor 202 or touch controller 206), memory, filters (e.g., anti-aliasing filters), etc. In some examples, touch sensing chip 730 can be referenced to the guard voltage by coupling the ground pin 734 of touch sensing chip 730 to the guard voltage output by the voltage driver 722 of guard chip 720.

As discussed herein, in some examples, the guard voltage output from guard chip 720 can be applied to one or more guard plane(s) 714 of touch sensor panel 710 and to the ground pin of touch sensing chip 730. In this way, touch sensing chip 730 can "float" relative to earth or chassis ground 724, which can reduce noise injected into one or more components of touch circuitry. For example, earth or chassis ground 724 can become capacitively coupled to a noise source, such as display circuitry within the electronic device and/or a noise source external to the electronic device. In some examples, the top and/or bottom guard planes can be positioned completely or partially between one or more touch node electrodes and one or more noise sources, such as a display. This configuration (locating the guard plane(s) between the touch node electrodes and noise source) can provide a shielding effect by receiving capacitively coupled noise and shunting the charge away from the touch node electrodes (providing noise isolation between the display and touch node electrodes). In some examples, the top and/or bottom guard planes can be driven by a guard voltage. In this configuration, with the guard planes and the touch node electrodes driven with the same signals or signals referenced to each other (e.g., at the same frequency, phase and amplitude), parasitic capacitive coupling between the guard plane(s) and the touch node electrodes can be minimized, which further shields the touch node electrodes from capacitively coupled noise. Similarly, while an "interrogated" touch node electrode (e.g., a touch node electrode being driven and sensed in the D/S configuration) is being sensed to determine the occurrence of a touch, other "non-interrogated" touch node electrodes (in the D configuration) can be driven with the same guard signal as the guard plane(s). In this configuration, the interrogated electrode can be surrounded by other touch node electrodes that can also be acting as a shield for the interrogated touch node electrode. As each touch node electrode is interrogated in one or more steps, the guard voltage can be selectively applied to other non-interrogated electrodes.

In some examples, a guard plane 714 can be located between touch node electrodes 712 and display circuitry (not shown) included in an electronic device that includes a touch and/or proximity detection system 700. Additionally or alternatively, the electronic device can include one or more guard planes in different locations (e.g., as illustrated in FIG. 6A), including in the same layer as the touch node electrodes 712 in a layer above the touch node electrodes 712 (e.g., between the layer including the touch node electrodes and a cover material (e.g., a cover glass) of the electronic device), for example. The one or more guard planes 714 can be coupled to and driven by guard chip 720 to shield the touch node electrodes from parasitic or stray capacitances as described herein.

Touch node electrodes 712 can be sensed to detect changes in capacitance due to capacitive coupling due to an object proximate to or touching the touch sensor panel, for example. One or more touch node electrodes 712 can be coupled to the inverting input of one or more sense amplifiers 732 of touch sensing circuitry in touch sensing chip 730, allowing each sense amplifier 732 to sense one or more touch signals indicative of an object proximate to or touching at the touch node corresponding to touch node electrode 712, for example. Although one sense amplifier 732 is shown in FIG. 7A, it should be understood that the touch sensing chip can include additional sense amplifiers to allow for sensing multiple touch nodes of the touch sensor panel partially or fully simultaneously (e.g., in parallel). In some examples, the non-inverting input of sense amplifier 732 can be virtually grounded by the guard voltage (e.g., possibly including some additional biasing (not shown)). The output of sense amplifier 732 can be converted to a digital signal at ADC 740 (which can receive both the non-inverted output signal from sense amplifier 732 and the inverted output signal from sense amplifier 732 in differential ADC examples or simply the output signal from sense amplifier 732 in single-ended ADC examples). The ADC can also be referenced to the guard voltage. The ADC can output a digital signal having n bits, which can be transmitted serially or in parallel using n channels. In some examples, touch sensing chip 730 can include a plurality of m sense amplifiers (e.g., similar to sense amplifier 732) and ADCs (e.g., similar to ADC 740) to simultaneously sense multiple touch node electrodes, thereby creating a system that can efficiently sense touch at a variety of sizes of touch sensor panels (e.g., by scaling m as a function of touch sensor panel size).

Guard chip 720 and touch sensing chip 730 can be separate integrated circuit chips as illustrated in FIG. 7A. In some examples, both guard chip 720 and touch sensing chip 730 can be implemented on a single integrated circuit chip. For example, the components of touch sensing chip 730 can be placed in a deep well (e.g., n-well) to isolate circuitry operating in the guard domain from guard chip 720 and its associated circuitry operating in the chassis or earth ground domain. For example, sense amplifier 732 referenced to the guard voltage can be placed in a deep well to be isolated from guard driver 722 referenced to the chassis or earth ground domain.

In some examples, an electronic device including touch and/or proximity detection system 700 can further include additional electronic components (e.g., touch processor 202, host processor 228, program storage 232, LCD driver 234 illustrated in FIG. 2) in the earth or chassis ground domain. One or more of these components, such as a touch processor or host processor may receive touch signals from ADC 740 for further processing, for example. In some examples, the touch signal data can be level shifted from the guarded domain to the earth or chassis ground domain prior to further processing.

Figure 7B:
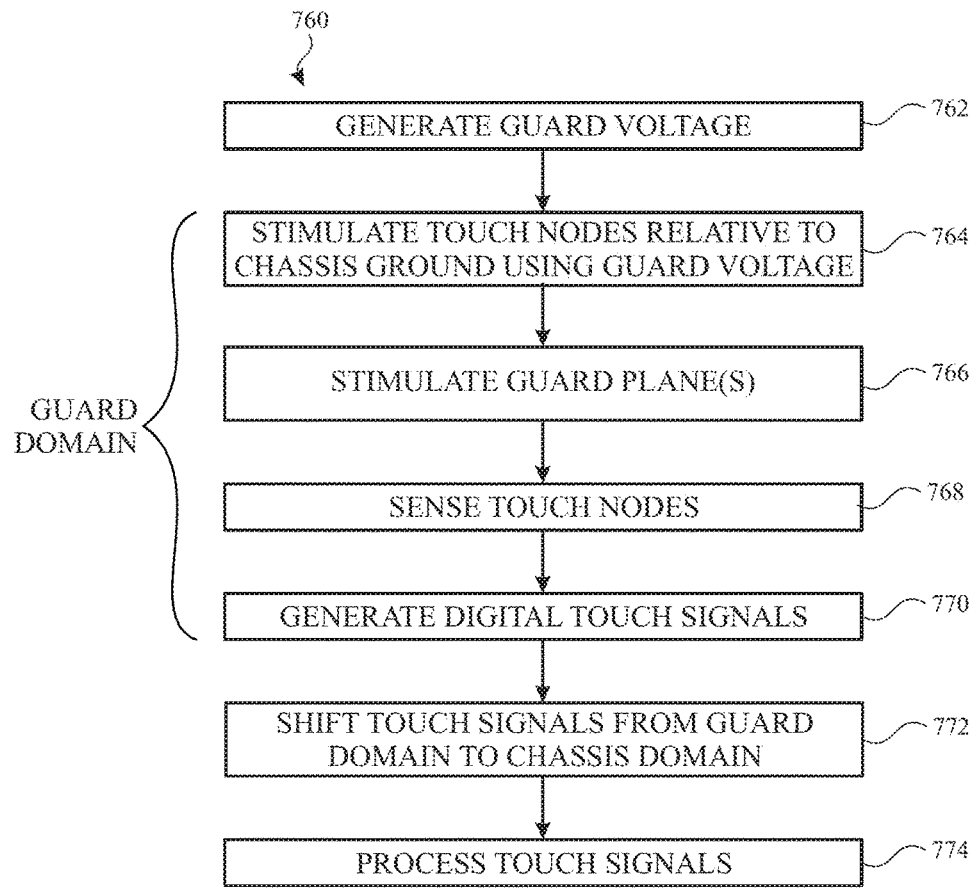
FIG. 7B illustrates an exemplary process for detecting one or more touching or proximate objects using a touch and/or proximity detection system according to examples of the disclosure.

FIG. 7B illustrates an exemplary process 760 for detecting one or more touching or proximate objects using touch and/or proximity detection system 700 according to examples of the disclosure. Some of process 760 can be executed in the earth or chassis ground domain and some of process 760 can be executed in the guard domain.

At 762, a guard voltage can be generated (e.g., by voltage driver 722 of guard chip 720). As described herein, the guard voltage can be used as the ground reference for the touch and/or proximity sensing. At 764, touch node electrodes of the touch sensor panel (such as touch node electrode 712) can be stimulated relative to earth ground using the guard voltage. At 766 one or more guard planes 714 of the touch sensor panel can be stimulated using the guard voltage. The stimulation of the touch node electrodes and the guard planes can occur simultaneously in some examples. In such examples, the guard voltage can be generated and applied to guard planes when necessary for shielding during touch and/or proximity sensing operations, and not be generated or applied when touch and/or proximity sensing does not occur (e.g., during which time the guard ground can be at the same potential as the earth or chassis ground). At 768, the touch node electrodes can be sensed by touch sensing circuitry (e.g., by sense amplifier 732) referenced to the guard voltage. Sensing the touch node electrodes can generate touch signals for each touch node (where the magnitude of the touch signal can indicate the presence or a touching or proximate object). A proximate or touching object, which is grounded to the chassis/earth ground, can capacitively couple to one or more touch node electrodes causing changes in capacitance that can be converted to one or more touch signals by respective sense amplifiers 732. The touch signal output by a sense amplifier can have an amplitude equal to $V_{guard} \cdot C_{touch}/C_{fb}$, where $V_{guard}$ represents the guard voltage amplitude, $C_{fb}$ represents the feedback capacitance of sense amplifier 732 and $C_{touch}$ represents the capacitance between object 610 and touch node electrode 608. At 770, the touch signals sensed by the touch sensing circuitry can be converted into a digital touch signal for further processing (e.g., by ADC 740). In some examples, the digital touch signal can be generated by single-ended circuitry. In some examples, the digital touch signal can be generated by differential circuitry. In such examples, the touch signal can be inverted (e.g., by inverter 738) and supplied to the second input of the differential circuitry along with the touch signal supplied to the first input of the differential circuitry (e.g., to two inputs of a differential ADC). 764-770 can be performed by the touch sensing chip 730 operating in the guarded domain. At 772, the digital touch signals can be level shifted from the guard domain to the earth or chassis ground domain. At 774, the touch processor can process the digital touch signals to identify the presence of and/or locate one or more objects in contact with or proximate to the touch sensor panel 710. The processing by the touch processor can be performed in the earth or chassis ground domain. In some examples, rather than level shifting at 772 and processing the touch signals in the earth or chassis ground domain, the touch processor can also be implemented in the guard domain and the leveling shifting can be performed for data to be transferred to a host processor operating in the earth or chassis ground domain.

Although process 760 has been described with reference to FIG. 7B, in some examples, additional or alternative steps are possible. Further, some or all of process 760 can be repeated, omitted, or modified without departing from the scope of the disclosure.

It should be understood that touch and/or proximity detection system 700 is one example system that can use guarding to mitigate parasitic or stray capacitances in the system, but different arrangements of components are possible. As mentioned above, the touch sensing chip 720 can include m sense amplifiers. In some examples, to enable parallel processing, each of them sense amplifiers can have m corresponding ADCs. Each ADC can output n bits of data when transmitting the bits of data in parallel, for example. Therefore, in order to level shift all of the digital data for further processing, n×m channels can be level shifted simultaneously. In some examples, it can be advantageous to provide a system that can reduce the amount of data requiring level shifting between operating domains (e.g., to reduce power). Further, operating both the sense amplifier 732 and the ADC 740 (the analog front end (AFE) of each sense channel) in the guard domain can require powering both of these components (and any other AFE components) in the guard domain, as will be discussed below with reference to FIGS. 8A-8B. Therefore, in some examples, some circuitry illustrated in touch sensing chip 730 can be operated in the earth or chassis ground domain and other circuitry illustrated in touch sensing chip 730 can be operated in the guard domain, as will be described with reference to FIGS. 9A-9C.

Figure 8A:
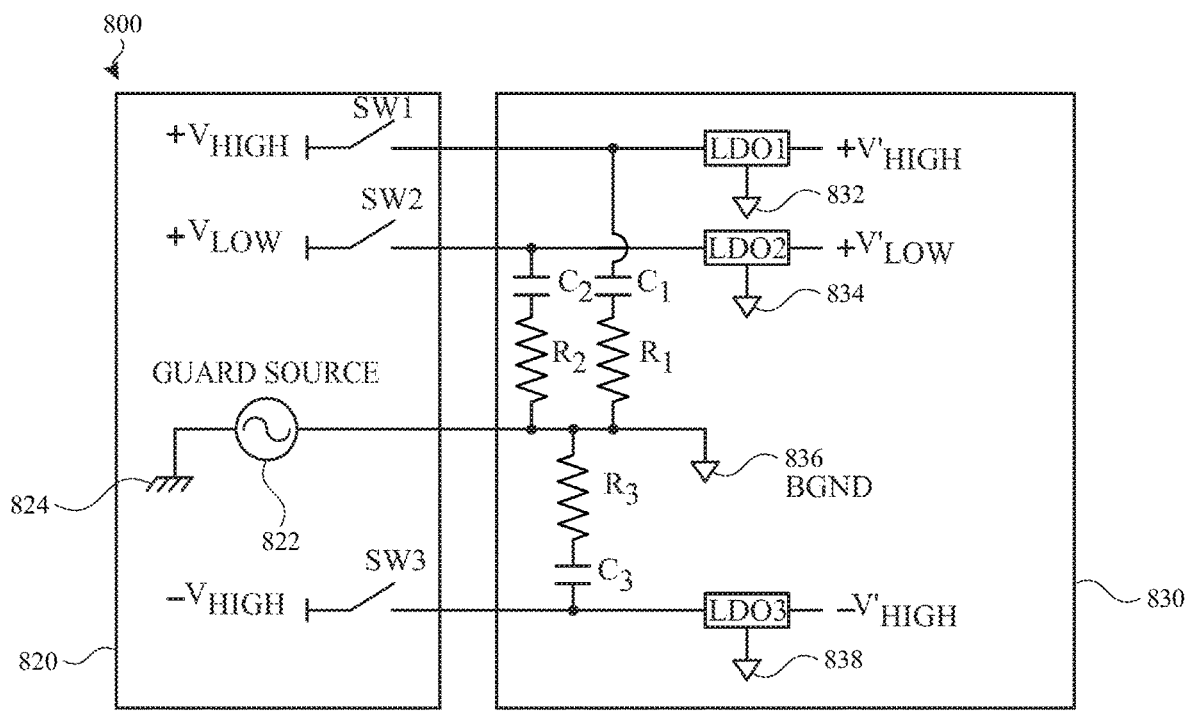
FIG. 8A illustrates an exemplary power system for a system operating in two power domains according to examples of the disclosure.

As discussed herein, the touch sensing chip 730 operating in the guard domain can be powered by the guard generating chip operating in the chassis or earth ground domain. FIG. 8A illustrates an exemplary power system 800 for a system operating in two power domains according to examples of the disclosure. In some examples, power system can include components included in guard chip 820 (e.g., corresponding to guard chip 720) and components included in touch sensing chip 830 (e.g., e.g., corresponding to touch sensing chip 730). Guard chip 820 can be referenced to earth or chassis ground 824 (e.g., earth or chassis ground domain) and touch sensing chip 830 can be referenced to a guard voltage (e.g., guard domain). For example, guard chip 820 can include voltage driver 822 to generate a guard voltage for guarded referencing. Additionally, guard chip 820 can include different power buses. For example, FIG. 8A illustrates a $+V_{high}$ power bus, a $+V_{low}$ power bus, a $-V_{high}$ power bus. Guard chip 820 can also include switching circuitry to selectively couple the voltage buses of guard chip 820 to touch sensing chip 830. For example, FIG. 8A illustrates a first switch SW1, a second switch SW2, and a third switch SW3 (one for each of the three buses). In some examples, one or more of the switches SW1, SW2, and SW3 can comprise a diode (e.g., a Schottky diode) and can be current limited to limit the inrush current into capacitors Cn when the guard signal is LOW.

In some examples, touch sensing chip 830 can include multiple voltage regulators. For example, FIG. 8A illustrates a first voltage regulator LDO1, a second voltage regulator LDO2, a third voltage regulator LDO3. Touch sensing chip 830 can also include multiple capacitors and resistors (e.g., a first capacitor C1, a second capacitor C2, a third capacitor C3, a first resistor R1, a second resistor R2, and a third resistor R3). To power one or more components of touch sensing chip 830 operating in the guard domain, one or more power buses (e.g., $+V_{high}$, $+V_{low}$, and $-V_{high}$) can be transposed from the earth or chassis ground domain to the guard domain (e.g., thereby creating busses $+V'_{high}$, $+V'_{low}$, and $-V'_{high}$), for example. In some examples, voltage regulators LDO1, LDO2, and LDO3 can be referenced to guard ground by way of pins 832, 834, and 838 to generate power buses $+V'_{high}$, $+V'_{low}$, and $-V'_{high}$ in the guard domain. The inputs of voltage regulators LDO1, LDO2, and LDO3 can be switchably coupled to power buses $+V_{high}$, $+V_{low}$, and $-V_{high}$ by way of switches SW1, SW2, and SW3, for example. For example, while switches SW1, SW2, and SW3 are closed, LDO1, LDO2, and LDO3 can be powered by power buses $+V_{high}$, $+V_{low}$, and $-V_{high}$ and capacitors C1, C2, and C3 can accumulate charge. In some examples, while switches SW1, SW2, and SW3 are open, capacitors C1, C2, and C3 can discharge to continue to power LDO1, LDO2, and LDO3. In this way, capacitors C1, C2, and C3 can be configured as flyback capacitors coupled to guard ground at pin 836 through resistors R1, R2, and R3. Resistors R1, R2 and R3 can be used to limit current from guard source 822 during the LOW phase of the guard signal and/or to keep the guard source stable when loaded with capacitors Cn. Charge current through guard source (e.g., output of a guard buffer) during the guard LOW phase can be also achieved by current limiting the guard buffer of guard source 822.

Figure 8B:
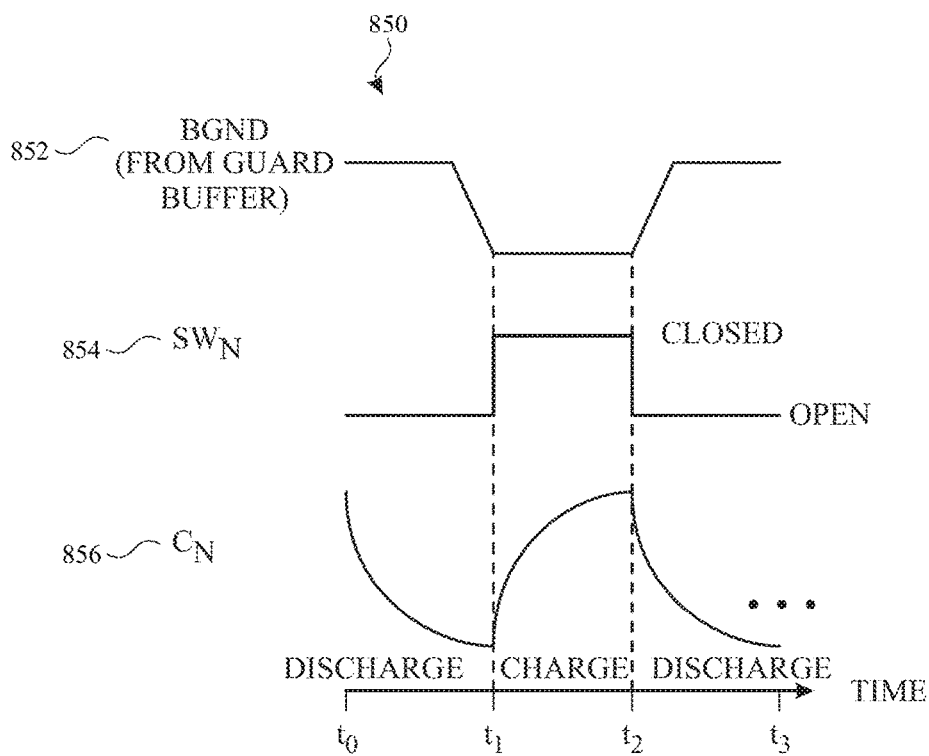
FIG. 8B illustrates an exemplary timing diagram for operating an exemplary power system according to examples of the disclosure.

FIG. 8B illustrates an exemplary timing diagram 850 for operating power system 800 according to examples of the disclosure. Voltage driver 822 can generate an alternating voltage signal, guard voltage 852, for example. In some examples, the operation of switches SW1, SW2, and SW3 and the charge present on capacitors C1, C2, and C3 can be coordinated with the polarity of guard voltage 852. For example, during a time period from t0 to t1, guard voltage 852 can have a high or positive voltage (guard HIGH) and switch SWn (e.g., SW1 or SW2) can be open, allowing capacitor Cn (e.g., C1 or C2) to discharge, where the discharge can provide the power to operate the corresponding LDOs and subsequent circuitry powered by the LDOs. During a time period from t1 to t2, virtual ground 852 can have a low or negative voltage (guard LOW) and switch SWn (e.g., SW1 or SW2) can be closed, allowing capacitor Cn (e.g., C1 or C2) to charge for the next transition of guard voltage 852 while the corresponding voltage regulator (e.g., LDO1 or LDO2) receives power from a respective power bus (e.g., $+V_{high}$ or $+V_{low}$). In some examples, SW3 and C3 can operate in a similar but inverted manner (e.g., SW3 can be open when virtual ground is low or negative and SW3 can be closed when virtual ground is high or positive) to deliver a negative voltage to LDO3. Additional details of powering circuitry in a system operating in two power domains are described in U.S. patent application Ser. No. 15/663,271 to Christoph H. KRAH et al. ("TOUCH SENSOR PANEL WITH MULTI-POWER DOMAIN CHIP CONFIGURATION"), which is herein incorporated by reference for all purposes.

Figure 9A:
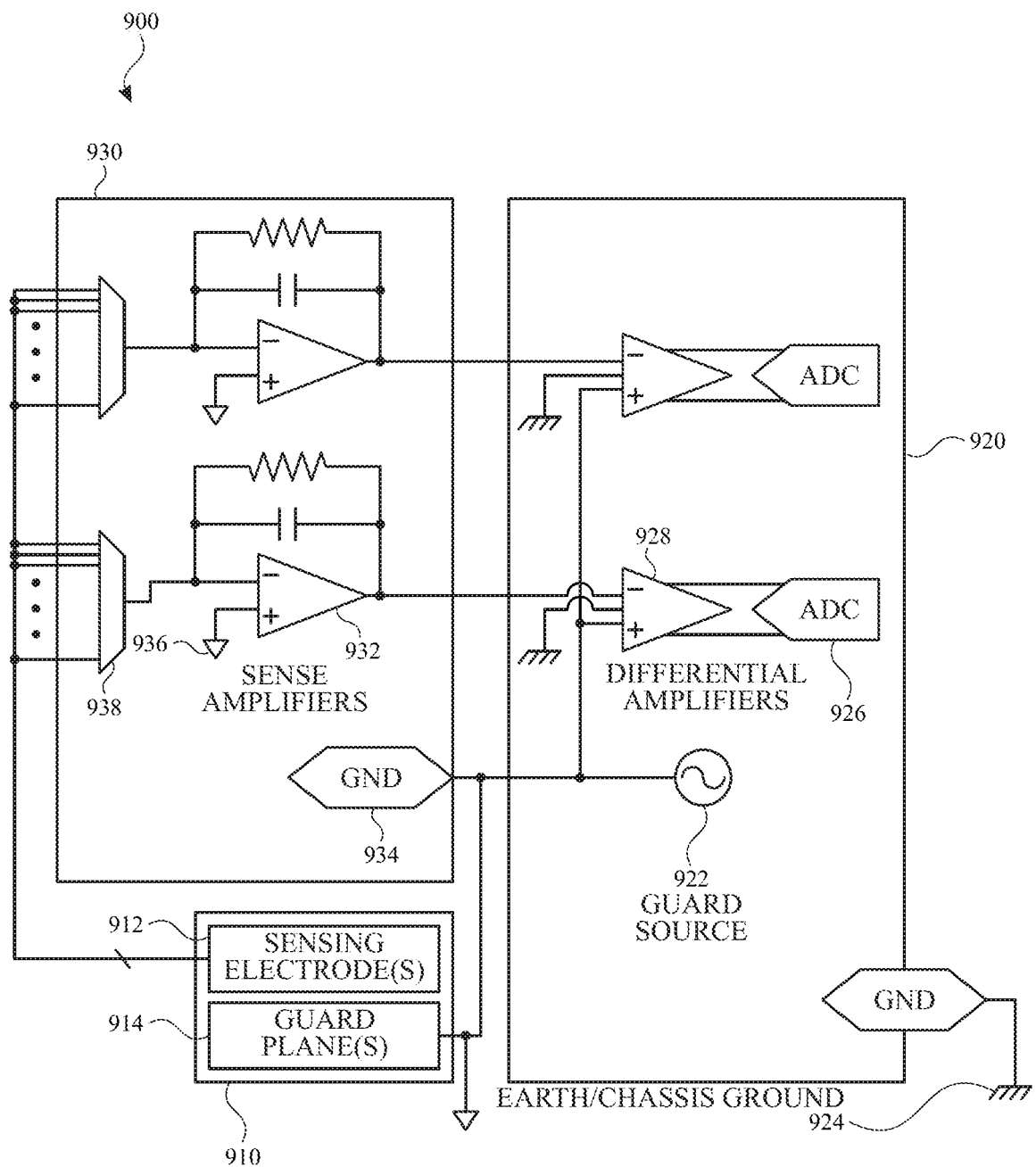
FIG. 9A illustrates an exemplary block diagram of a touch and/or proximity detection system according to examples of the disclosure.

In some examples, the power requirements for touch sensing chip 830 can be reduced, level-shifting requirements can be simplified and/or interconnections can be reduced by moving some components of the AFE from the guarded domain to the chassis or earth ground domain. Reducing the number of powered components in the guarded domain, for example, can reduce the burden of power system 800, allowing the size of capacitors C1, C2, and C3 to be reduced, for example. Additionally, by performing level shifting in the analog domain (e.g., at the output of the sense amplifier), fewer signals are required between the guard referenced touch sensing chip 930 and the chassis or earth ground referenced touch sensing chip 920. FIG. 9A illustrates an exemplary block diagram of a touch and/or proximity detection system 900 according to examples of the disclosure. In some examples, touch and/or proximity detection system 900 can include a touch sensor panel 910, chassis or earth ground referenced touch sensing chip 920, and guard referenced touch sensing chip 930. Touch sensor panel 910 can include one or more touch node electrodes 912 and one or more guard planes 914. In some examples, chassis or earth ground referenced touch sensing chip 920 can include voltage driver 922, differential amplifiers 928, and ADC 926. Guard referenced touch sensing chip 930 can include one or more sense amplifiers 932 configured to be coupled to touch node electrodes 912 of touch sensor panel 910 (e.g., by switching circuitry such as multiplexers 938). In some examples, chassis or earth ground referenced touch sensing chip 920 can be referenced to earth or chassis ground 924 and guard referenced touch sensing chip 930 can be referenced to guard ground 922.

Chassis or earth ground referenced touch sensing chip 920 can include voltage driver 922 configured to generate a guard voltage. In some examples, voltage driver 922 can be coupled to one or more guard planes 914 of touch sensor panel 910 and ground pin 934 of guard referenced touch sensing chip 930. In this way, guard referenced touch sensing chip 930 can "float" relative to earth or chassis ground 924, which can shield one or more components of touch circuitry from noise. For example, earth or chassis ground 924 can become capacitively coupled to a noise source (e.g., noise from display circuitry within the electronic device and/or a noise source external to the electronic device), which can be shielded by guarding. In some examples, chassis or earth ground referenced touch sensing chip 920 can further include one or more touch sensing components for touch sensing, such as differential amplifiers 928 and ADCs 926.

In some examples, one or more guard planes 914 can be located between touch node electrode 912 and display circuitry (not shown) included in an electronic device having touch and/or proximity detection system 900. Additionally or alternatively, the electronic device can include one or more guard planes in different locations (e.g., on the same layer as the touch node electrodes 912 or on a different layer between the touch node electrodes and a cover material (e.g., a cover glass) of the electronic device). In some examples, one or more guard planes 914 can be coupled to voltage driver 922 of chassis or earth ground referenced touch sensing chip 920 to receive a guard voltage (e.g., guard ground). Touch node electrode 912 can become capacitively coupled to an object proximate to or touching the touch sensor panel 910, for example.

Touch node electrode 912 can be coupled to the inverting input of sense amplifier 932, allowing sense amplifier 932 to sense one or more touch signals indicative of an object proximate to or touching the touch node electrode, for example. In some examples, each touch node electrode can have a corresponding sense amplifier (e.g., a 1:1 ratio between touch node electrodes and sense amplifiers) to enable simultaneous sensing of each touch node electrode in one scan step. The coupling between each touch node electrode corresponding sense amplifier can be hard wired or via switching circuitry. The switching circuitry can enable touch node electrodes to be stimulated and sensed (D/S configuration), stimulated without being sensed (D configuration) or grounded (G configuration) or otherwise held at a DC voltage. In some examples, the touch node electrodes 912 of touch sensor panel 910 can be coupled to sense amplifiers 932 through multiplexer 938 (or other switching circuitry). The switching capability can, in some examples, allow for fewer sense amplifiers (and thereby less circuitry) to be used to sense a touch sensor panel of a given size (in addition to providing different configurations (D/S, D or G) for touch node electrodes). For example, a touch sensor panel with 1000 touch nodes can be sensed using 50 sense amplifiers in 20 scan steps. During each scan step different touch node electrodes can be coupled to the available sense amplifiers. In some examples, the non-inverting input of sense amplifier 932 can be coupled to virtual ground pin 936 referenced to the guard voltage generated by voltage driver 922. Although multiplexers 938 are illustrated in guard referenced touch sensing chip 930, in some examples, they may be implemented separately from guard referenced touch sensing chip 930 (e.g., in a different chip).

The block diagram of FIG. 9A includes in the guarded domain only a portion of the touch sensing circuitry illustrated in the guarded domain in FIG. 7A (e.g., the single ended to differential conversion and analog to digital converter implemented in the guarded domain in FIG. 7A can be implemented in the earth or chassis ground domain as illustrated in FIG. 9A). The remaining touch sensing circuitry can be implemented in the earth or chassis ground domain. This arrangement can reduce the number of components in the guard domain, thereby reducing the components to be powered in the guarded domain (reducing the requirements for the power system for "floating" guard-domain power supplies). Additionally, by level shifting analog signals between the guard domain and the earth or chassis ground domain rather than digital signals, the level shifting burden can be reduced. Specifically, the level shifting can be performed on the single-channel analog output of sense amplifiers 932, rather than on the multi-channel output of ADC 740 (e.g., n bits/channel per ADC output).

The level shifting between the guarded domain and the earth or chassis ground domain can be achieved with differential amplifiers 928. In some examples, the non-inverting inputs of differential amplifiers 928 can be coupled to the guard voltage output by voltage driver 922 and the inverting input can receive the analog output from sense amplifier 932. In this way, the touch signals from sense amplifiers 932 can be level shifted from the virtual ground domain to the earth or chassis ground domain (e.g., by subtracting the guarded voltage contribution to the touch signal from the touch signal). The differential amplifiers 928 can be referenced to earth or chassis ground 924. Additionally, the ADC can be referenced to earth or chassis ground 924. The differential ADC 926 can convert the differential output of differential amplifier 928 to a digital signal. Although analog circuitry is shown in FIG. 9A, additional digital signal processing can be included on the chassis or earth ground referenced touch sensing chip 920 (e.g., touch processor 202, touch controller 206). It should be understood that touch and/or proximity detection system 900 can divide touch signal processing between guard referenced touch sensing chip 930 and chassis or earth ground referenced touch sensing chip 920 in other ways than illustrated in FIG. 9A.

Figure 9B:
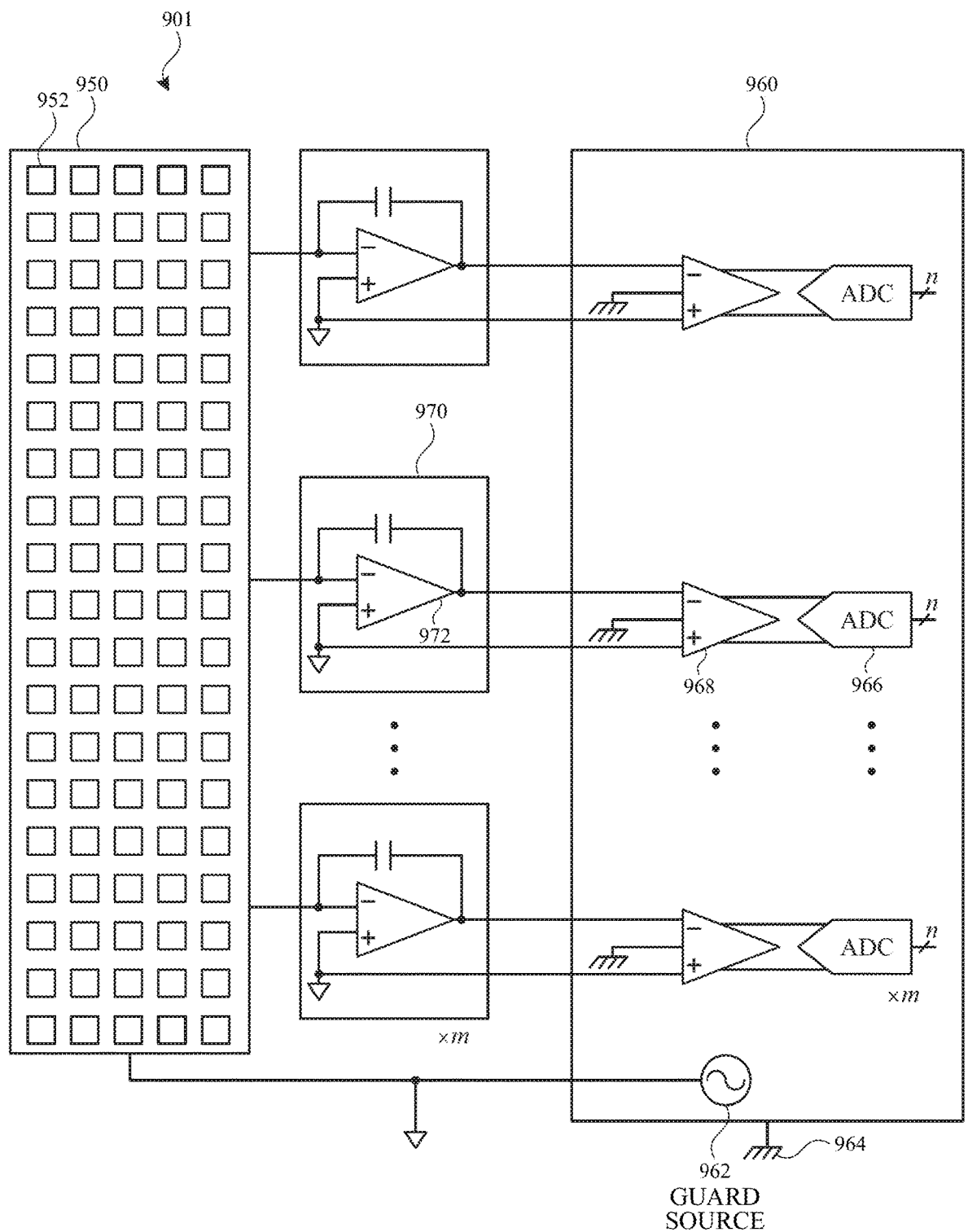
FIG. 9B illustrates an exemplary block diagram of a touch and/or proximity detection system according to examples of the disclosure.

Implementing the sense amplifier 932 in a guard domain chip separate from other analog and/or digital circuitry can improve scalability for touch sensor panels of different sizes. FIG. 9B illustrates an exemplary block diagram of a touch and/or proximity detection system 901 according to examples of the disclosure. In some examples, proximity detection system 901 can include a touch sensor panel 950, chassis or earth ground referenced touch sensing chip 960, and multiple touch sensing chips 970. Touch sensor panel can include one or more touch node electrodes 952 (and one or more guard planes). In some examples, chassis or earth ground referenced touch sensing chip 960 can include voltage driver 962, differential amplifiers 968, and ADCs 966 for a first number of sense channels. The chassis or earth ground referenced touch sensing chip 960 can act as a master chip for multiple guard referenced touch sensing chips 970. Guard referenced touch sensing chips 970 can each include sense amplifiers 972. Although one sense amplifier is illustrated in each guard referenced touch sensing chip 970, it should be understood that each can include multiple sense amplifiers.

Although not shown in FIG. 9B, in some examples, each guard referenced touch sensing chip 970 can further include one or more multiplexers (e.g., multiplexer 938) or other switching circuitry, which can enable each sense amplifier 972 of the touch circuitry 972 to be coupled to some or all of the touch node electrodes of the touch sensor panel. In some examples, the multiplexers can be implemented separately from guard referenced touch sensing chips 970 to enable sharing. For example, one multiplexer chip can be shared by two (or more) guard referenced touch sensing chips 970. In such examples, the multiplexer can also be a guard referenced multiplexer chip. Additionally or alternatively, chassis or earth ground referenced touch sensing chip 960 can include a plurality of multiplexers (e.g., between the sense amplifiers 972 and the inverting inputs of the differential amplifiers 968), for example.

The number of guard referenced touch sensing chips 970 for a touch sensor panel can be a function of the size of the touch sensor panel and the number of sense channels in each guard referenced touch sensing chip 970. For example, when using a guard referenced touch sensing chip 970 including 20 sense channels (e.g., 20 sense amplifiers), two guard referenced touch sensing chips 970 can be used for a touch sensor panel including 40 touch node electrodes and ten guard referenced touch sensing chips 970 can be used for a touch sensor panel including 200 touch node electrodes. In some examples, chassis or earth ground referenced touch sensing chip 960 can include the same number of differential amplifiers and ADCs as each of the guard referenced touch sensing chips 970. For example, a chassis or earth ground referenced touch sensing chip 960 with a fixed number m of differential amplifiers 968 and ADCs 966 can be used for scalability for use with a flexible number of guard referenced touch sensing chips (e.g., each including m sense amplifiers). Although proximity detection system 901 is illustrated as including m sense amplifiers 972, m differential amplifiers 968, and m ADCs 966, in some examples, the number of sense amplifiers can be different from the number of differential amplifiers and ADCs included in a touch and/or proximity detection system according to examples of the disclosure. For example, chassis or earth ground referenced touch sensing chip 960 can include switching circuitry (e.g., analog MUXs) which can be operated to couple the sense amplifiers 972 of respective guard referenced touch sensing chips 970 to differential amplifiers 968. Such a configuration can reduce the number of differential amplifiers and ADCs in chassis or earth ground referenced touch sensing chip 960 while maintaining the ability to interface with a larger number of sense channels distributed in multiple guard referenced touch sensing chips 970.

In some examples, the differential amplifiers in the chassis or earth ground referenced touch sensing chip can receive the guard voltage by a trace in the chassis or earth ground referenced touch sensing chip. For example, as illustrated in FIG. 9A, the guard voltage generated in chassis or earth ground referenced touch sensing chip 920 can be supplied to differential amplifier 928 by a trace within chassis or earth ground referenced touch sensing chip 920. In some examples, as illustrated in FIG. 9B, the guard voltage generated in chassis or earth ground referenced touch sensing chip 960 can be supplied to differential amplifier 968 by a routing trace from the guard referenced touch sensing chip 970 to the chassis or earth ground referenced touch sensing chip 960. This arrangement can reduce phase drift between the guarded voltage supplied to one terminal of the differential amplifier and the touch signal suppled to the second terminal of the differential amplifier (e.g., by providing conductive paths of substantially the same length to carry both the touch signal and the guard signal. In some examples, the differential amplifiers 968 can be directly connected to guard source 962 within earth or chassis ground referenced touch sensing chip 960. For example, one or more conductive traces carrying the guard signal can have a wide cross-sectional area, thereby reducing electrical resistance of the conductive trace and reducing phase drift of the guard signal.

Additionally or alternatively, the routing traces carrying the touch signals from the guard referenced touch sensing chip 970 to the chassis or earth ground referenced touch sensing chip 960 can be proximate to one or more guard planes. In some examples, the guard planes can sandwich the routing carrying touch signals forming a coaxial cable structure (e.g., carrying the guarded voltage to shield the inner conductive path carrying the guarded touch signal from one or more noise sources). Additionally or alternatively, one or more routing traces conducting a signal from a touch node electrode 952 can be shielded using a coaxial cable structure, for example.

In some examples, the guard referenced touch sensing chips 970 can be physically located close to touch sensor panel 950. For example, a first guard referenced touch sensing chip 970 sensing touch node electrodes in a first portion of the touch sensor panel can be placed proximate to the first portion. Likewise a second guard referenced touch sensing chip 970 sensing touch node electrodes in a second portion of the touch sensor panel can be placed proximate to the second portion. This proximity can reduce the routing complexity near the touch sensor panel and improve the sensing of changes in capacitances at touch node electrodes of the touch sensor panel. The output from the guard referenced touch sensing chips can be transmitted to a master earth or chassis ground referenced touch sensing chip (e.g., with a guard voltage trace that also travels between the guard referenced touch sensing chip to the earth or chassis ground referenced touch sensing chip to reduce phase drift at the differential amplifiers in the earth or chassis ground referenced touch sensing chip).

Figure 9C:
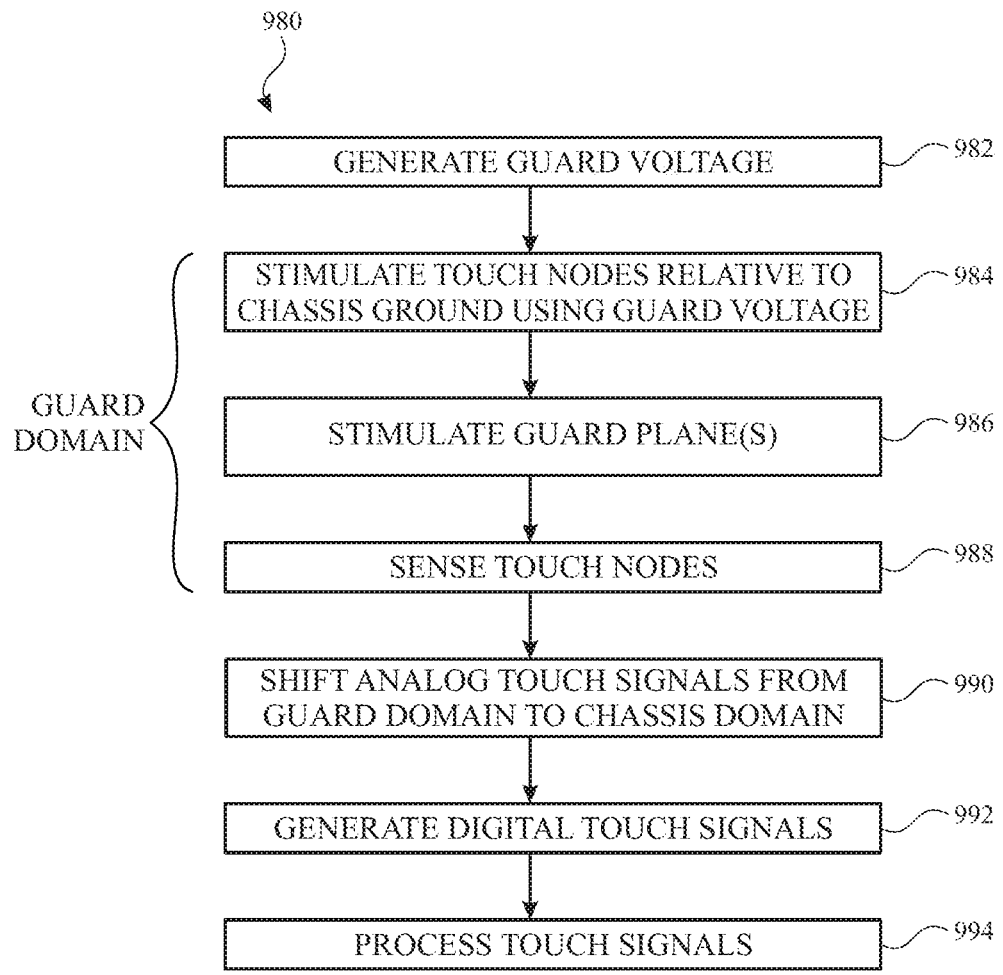
FIG. 9C illustrates an exemplary process of operating a touch and/or proximity detection system according to examples of the disclosure.

FIG. 9C illustrates an exemplary process 980 of operating touch and/or proximity detection systems 900 or 901 according to examples of the disclosure. Some of process 980 can be executed in the earth or chassis ground domain and some of process 980 can be executed in the guard domain.

At 982 of process 980, a virtual ground signal can be provided (e.g., by voltage driver 922 or 962). At 984, a proximate object can capacitively couple to a touch node electrode (e.g., touch node electrode 912 or 952). In some examples, 982 and 984 can occur in the earth or chassis ground domain.

At 982, a guard voltage can be generated (e.g., by voltage driver 922 or 926 of guard chip 920 or 970). As described herein, the guard voltage can be used as the ground reference for the touch and/or proximity sensing. At 984, touch node electrodes of the touch sensor panel (such as touch node electrode 912 or 952) can be stimulated using the guard voltage. At 986 one or more guard planes 914 of the touch sensor panel can be stimulated using the guard voltage. The stimulation of the touch node electrodes and the guard planes can occur simultaneously in some examples. In such examples, the guard voltage can be generated and applied to guard planes when necessary for shielding during touch and/or proximity sensing operations, and not be generated or applied when touch and/or proximity sensing does not occur. At 988, the touch node electrodes can be sensed by touch sensing circuitry (e.g., by sense amplifier 932 or 972) referenced to the guard voltage. Sensing the touch node electrodes can generate touch signals for each touch node (where the magnitude of the touch signal can indicate the presence or a touching or proximate object). A proximate or touching object, which is grounded to the chassis/earth ground, can capacitively couple to one or more touch node electrodes causing changes in capacitance that can be measured through the touch signals. 982-988 can be performed by the touch sensing chip 930 or chips 970 operating in the guarded domain. At 990, the analog touch signals can be level shifted from the guard domain to the earth or chassis ground domain. At 992, the touch signals sensed by the touch sensing circuitry can be converted into a digital touch signal for further processing (e.g., by ADC 926 or 966). In some examples, the digital touch signal can be generated by single-ended circuitry. In some examples, the digital touch signal can be generated by differential circuitry. In such examples, the touch signal can be inverted (e.g., by an inverter) and supplied to the second input of the differential circuitry along with the touch signal supplied to the first input of the differential circuitry. At 994, the touch processor can process the digital touch signals to identify the presence of and/or locate one or more objects in contact with or proximate to the touch sensor panel 910 or 950. The processing by the touch processor can be performed in the earth or chassis ground domain.

Although process 980 has been described with reference to FIG. 9C, in some examples, additional or alternative steps are possible. Further, some or all of process 980 can be repeated, omitted, or modified without departing from the scope of the disclosure.

Therefore, according to the above, some examples of the disclosure are directed to an electronic device. The electronic device can comprise a first chip operating in a first power domain referenced to a first voltage and a second chip operating in a second power domain referenced to the second voltage. The first chip can comprise an analog-to-digital converter (ADC) having a first input and a voltage source configured to output a second voltage. The second chip can comprise a sense amplifier having a first input configured to be coupled to a touch node electrode, having a second input configured to be coupled to the second voltage, and having an output configured to be coupled to the first input of the ADC. Additionally or alternatively to one or more of the examples disclosed above, in some examples, the first voltage can be a chassis ground of the electronic device. Additionally or alternatively to one or more of the examples disclosed above, in some examples, the first chip can further comprise a differential amplifier having a first input configured to be coupled to the output of the sense amplifier, having a second input configured to be coupled to the second voltage, and having an output coupled to the first input of the ADC. Additionally or alternatively to one or more of the examples disclosed above, in some examples, the electronic device can further comprise one or more guard electrodes between the first chip and the second chip. The one or more guard electrodes can be configured to be coupled to the second voltage. The second input of the differential amplifier can be configured to be coupled to the one or more guard electrodes between the first chip and the second chip to supply the second voltage. Additionally or alternatively to one or more of the examples disclosed above, in some examples, the electronic device can further comprise a first conductive trace carrying the output of the sense amplifier to the first input of the differential amplifier and a second conductive trace carrying the second voltage to the second input of the differential amplifier. The first conductive trace and the second conductive trace can have the same length. Additionally or alternatively to one or more of the examples disclosed above, in some examples, the electronic device can further comprise a third conductive trace carrying the second voltage. The second conductive trace and the third conductive trace can be routed on opposite sides of the first conductive trace to shield the output of the sense amplifier. Additionally or alternatively to one or more of the examples disclosed above, in some examples, the first chip can further comprise a plurality of sense amplifiers and the second chip can further comprise a plurality of ADCs and a plurality of differential amplifiers.

Each sense amplifier can be coupled to one of the plurality of differential amplifier and each differential amplifier is coupled to one of the ADCs. Additionally or alternatively to one or more of the examples disclosed above, in some examples, the electronic device can further comprise one or more guard electrodes coupled to the second voltage. The one or more guard electrodes can be configured to shield the output of the sense amplifier. Additionally or alternatively to one or more of the examples disclosed above, in some examples, the first chip and the second chip can be formed on one integrated circuit. The second chip can be isolated in a deep well. Additionally or alternatively to one or more of the examples disclosed above, in some examples, the electronic device can further comprise a touch screen including the touch node electrode, display circuitry and a guard electrode. The guard electrode can be disposed between the display circuitry and the touch node. The guard electrode and touch node electrode can be configured to be coupled to the second voltage during touch sensing. Additionally or alternatively to one or more of the examples disclosed above, in some examples, the second voltage can be a guard voltage. Additionally or alternatively to one or more of the examples disclosed above, in some examples, the first chip can further comprise a power supply with a third voltage referenced to the first voltage and the second chip can further comprise a voltage regulator referenced to the second voltage. The voltage regulator can have an input configured to be coupled to the third voltage and an output configured to generate a fourth voltage referenced to the second voltage to power the sense amplifier. Additionally or alternatively to one or more of the examples disclosed above, in some examples, the second chip can further comprise a capacitor referenced to the second voltage and coupled to the input of the voltage regulator. The capacitor can be configured to maintain the input to the voltage regulator within a threshold amount of the third voltage during a first state of the second voltage.

Some examples of the disclosure are directed to a method of touch sensing with an electronic device including a first chip operating in a first power domain referenced to a first voltage and a second chip operating in a second power domain referenced to a second voltage. The method can comprise generating, at the first chip, the second voltage; sensing, at the second chip, an analog touch signal of a touch node electrode; transmitting the analog touch signal from the second chip to the first chip; and converting, at the first chip, the analog touch signal to a digital touch signal. Additionally or alternatively to one or more of the examples disclosed above, in some examples, the first voltage can be a chassis ground. Additionally or alternatively to one or more of the examples disclosed above, in some examples, the method can further comprise shifting, at the first chip, the analog touch signal transmitted from the second chip to the first chip from the second power domain to the first power domain. Shifting the analog touch signal can comprise subtracting, in the first chip, the second voltage from the analog touch signal transmitted from the second chip to generate to an analog touch signal relative to the first voltage. Additionally or alternatively to one or more of the examples disclosed above, in some examples, the method can further comprise driving one or more guard electrodes with the second voltage. Additionally or alternatively to one or more of the examples disclosed above, in some examples, the second voltage can be a virtual ground voltage. Additionally or alternatively to one or more of the examples disclosed above, in some examples, the method can further comprise supplying a third voltage from the first chip to the second chip; and generating, at the second chip, a fourth voltage to power touch sensing circuitry of the second chip. Additionally or alternatively to one or more of the examples disclosed above, in some examples, the third voltage can be supplied during a first time interval corresponding to a first state of the second voltage and maintained by circuitry in the second chip during a second time interval corresponding to a second state of the second voltage. Some examples of the disclosure are directed to a non-transitory computer readable storage medium. The non-transitory computer readable storage medium can store instructions, which when executed by one or more processors, can cause the one or more processors to perform any of the above methods.

Some examples of the disclosure are directed to an electronic device. The electronic device can comprise a first chip operating in a first power domain referenced to a first voltage and a plurality of second chips operating in a second power domain referenced to the second voltage. The first chip can comprise one or more analog-to-digital converters (ADCs) having a first input and a voltage source configured to output a second voltage. Each second chip can comprise a sense amplifier having a first input configured to be coupled to a touch node electrode, having a second input configured to be coupled to the second voltage, and having an output configured to be coupled to the first input of one of the one or more ADCs. Additionally or alternatively to one or more of the examples disclosed above, in some examples, the first chip can further comprise one or more differential amplifiers. Additionally or alternatively to one or more of the examples disclosed above, in some examples, the first chip can further comprise analog switching circuitry coupled to the one or more differential amplifiers. The switching circuitry can be configured to couple outputs from one or more of the second chips to the one or more differential amplifiers in the first chip. Additionally or alternatively to one or more of the examples disclosed above, in some examples, the switching circuitry can comprise one or more analog multiplexers.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
a first chip operating in a first power domain referenced to a first voltage, the first chip comprising:
an analog-to-digital converter (ADC) referenced to the first voltage and having a first input;
a voltage source configured to output a second voltage; and
a level shifting circuit referenced to the first voltage and having an output coupled to the first input of the ADC, wherein the level shifting circuit is configured to shift an analog signal from a second power domain referenced to the second voltage to the first power domain; and
a second chip operating in the second power domain referenced to the second voltage, the second chip comprising:
a sense amplifier having a first input configured to be coupled to a touch node electrode, having a second input configured to be coupled to the second voltage, and having an output configured to be coupled to the first input of the ADC via the level shifting circuit.

2. The electronic device of claim 1, wherein the first voltage is a chassis ground of the electronic device.

3. The electronic device of claim 1,
wherein the level shifting circuit comprises a differential amplifier referenced to the first voltage and having a first input configured to be coupled to the output of the sense amplifier, having a second input configured to be coupled to the second voltage, and having an output coupled to the first input of the ADC.

4. The electronic device of claim 3, further comprising:
one or more guard electrodes between the first chip and the second chip, the one or more guard electrodes configured to be coupled to the second voltage, wherein the second input of the differential amplifier is configured to be coupled to the one or more guard electrodes between the first chip and the second chip to supply the second voltage.

5. The electronic device of claim 3, further comprising:
a first conductive trace carrying the output of the sense amplifier to the first input of the differential amplifier; and
a second conductive trace carrying the second voltage to the second input of the differential amplifier, wherein the first conductive trace and the second conductive trace have a same length.

6. The electronic device of claim 5, further comprising:
a third conductive trace carrying the second voltage, wherein the second conductive trace and the third conductive trace are routed on opposite sides of the first conductive trace to shield the output of the sense amplifier.

7. The electronic device of claim 3, wherein:
the second chip further comprises:
a plurality of sense amplifiers; and
the first chip further comprises:
a plurality of ADCs; and
a plurality of differential amplifiers, wherein each sense amplifier is coupled to one of the plurality of differential amplifier and each differential amplifier is coupled to one of the ADCs.

8. The electronic device of claim 1, wherein the first chip and the second chip are formed on one integrated circuit, wherein the second chip is isolated in a deep well.

9. The electronic device of claim 1, further comprising:
a touch screen including the touch node electrode, display circuitry and a guard electrode, wherein the guard electrode is disposed between the display circuitry and the touch node electrode, and wherein the guard electrode and touch node electrode are configured to be coupled to the second voltage during touch sensing.

10. The electronic device of claim 1, wherein the second voltage is a guard voltage.

11. The electronic device of claim 1, wherein:
the first chip further comprises:
a power supply with a third voltage referenced to the first voltage; and
the second chip further comprises:
a voltage regulator referenced to the second voltage, the voltage regulator having an input configured to be coupled to the third voltage and an output configured to generate a fourth voltage referenced to the second voltage to power the sense amplifier.

12. The electronic device of claim 11, wherein the second chip further comprises:
a capacitor referenced to the second voltage and coupled to the input of the voltage regulator, the capacitor configured to maintain the input to the voltage regulator within a threshold amount of the third voltage during a first state of the second voltage.

13. A method of touch sensing with an electronic device including a first chip operating in a first power domain referenced to a first voltage and a second chip operating in a second power domain referenced to a second voltage, the method comprising:
   generating, at the first chip, the second voltage;
   sensing, at the second chip, an analog touch signal of a touch node electrode;
   transmitting the analog touch signal from the second chip to the first chip;
   shifting, at the first chip, the analog touch signal transmitted from the second chip to the first chip from the second power domain to the first power domain; and
   converting, at the first chip, the analog touch signal in the first power domain to a digital touch signal via an analog-to-digital converter referenced to the first voltage.

14. The method of claim 13, wherein the first voltage is a chassis ground.

15. The method of claim 13,
   wherein shifting the analog touch signal comprises subtracting, in the first chip, the second voltage from the analog touch signal transmitted from the second chip to generate a first-voltage-referenced analog touch signal.

16. The method of claim 13, further comprising:
   driving one or more guard electrodes with the second voltage.

17. The method of claim 13, wherein the second voltage is a virtual ground voltage.

18. The method of claim 13, further comprising:
   supplying a third voltage from the first chip to the second chip; and
   generating, at the second chip, a fourth voltage to power touch sensing circuitry of the second chip.

19. The method of claim 18, wherein the third voltage is supplied during a first time interval corresponding to a first state of the second voltage and maintained by circuitry in the second chip during a second time interval corresponding to a second state of the second voltage.

20. A non-transitory computer readable storage medium storing instructions, which when executed by an electronic device including a first chip operating in a first power domain referenced to a first voltage, a second chip operating in a second power domain referenced to a second voltage and one or more processors, cause the one or more processors to perform a method comprising:
   generating, at the first chip, the second voltage;
   sensing, at the second chip, an analog touch signal of a touch node electrode;
   transmitting the analog touch signal from the second chip to the first chip;
   shifting, at the first chip, the analog touch signal transmitted from the second chip to the first chip from the second power domain to the first power domain; and
   converting, at the first chip, the analog touch signal in the first power domain to a digital touch signal via an analog-to-digital converter referenced to the first voltage.

21. The non-transitory computer readable storage medium of claim 20, wherein the first voltage is a chassis ground and wherein the second voltage is a virtual ground voltage.

22. The non-transitory computer readable storage medium of claim 20,
   wherein shifting the analog touch signal comprises subtracting, in the first chip, the second voltage from the analog touch signal transmitted from the second chip to generate a first-voltage-referenced analog touch signal.

23. The non-transitory computer readable storage medium of claim 20, the method further comprising:
   driving one or more guard electrodes with the second voltage.

24. The non-transitory computer readable storage medium of claim 20, the method further comprising:
   supplying a third voltage from the first chip to the second chip; and
   generating, at the second chip, a fourth voltage to power touch sensing circuitry of the second chip.

25. The non-transitory computer readable storage medium of claim 24, wherein the third voltage is supplied during a first time interval corresponding to a first state of the second voltage and maintained by circuitry in the second chip during a second time interval corresponding to a second state of the second voltage.

* * * * *